(12) United States Patent
Pearce

(10) Patent No.: US 8,187,104 B2
(45) Date of Patent: May 29, 2012

(54) SYSTEM AND METHOD FOR CREATING, EDITING, AND SHARING VIDEO CONTENT RELATING TO VIDEO GAME EVENTS

(75) Inventor: Nathan Pearce, San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 664 days.

(21) Appl. No.: 12/360,070

(22) Filed: Jan. 26, 2009

(65) Prior Publication Data
US 2009/0131177 A1   May 21, 2009

Related U.S. Application Data

(63) Continuation-in-part of application No. 12/305,623, filed as application No. PCT/US2008/052362 on Jan. 29, 2008.

(60) Provisional application No. 61/062,309, filed on Jan. 25, 2008, provisional application No. 60/898,359, filed on Jan. 29, 2007.

(51) Int. Cl.
*A63F 13/00* (2006.01)
*A63F 9/24* (2006.01)
*G06F 17/00* (2006.01)
*G06F 19/00* (2006.01)

(52) U.S. Cl. .......................................................... 463/43
(58) Field of Classification Search ....................... 463/43
See application file for complete search history.

(56) References Cited

U.S. PATENT DOCUMENTS

| | | | |
|---|---|---|---|
| 7,650,625 B2 * | 1/2010 | Watkins | 725/139 |
| 2005/0026699 A1 * | 2/2005 | Kinzer et al. | 463/43 |
| 2006/0135232 A1 | 6/2006 | Willis | |
| 2006/0284981 A1 | 12/2006 | Erol et al. | |

FOREIGN PATENT DOCUMENTS

| | | |
|---|---|---|
| JP | 2001-006270 A | 1/2001 |
| KR | 10-2006-0100696 A | 9/2006 |
| KR | 10-2007-0011780 A | 1/2007 |
| WO | 2006098606 A1 | 9/2006 |

OTHER PUBLICATIONS

"Developer's Guide Protocol," Blogger Data API Google Search Engine, downloaded Mar. 24, 2008. pp. 1-8.
"What is the flogger data API", Blogger Data API, Goode Search Engine, downloaded Mar. 24, 2008, pp. 1-2.
"Reference Guide". Slogger Data API, Google Search Engine, downloaded Mar. 24, 2008, pp. 1-3.

* cited by examiner

*Primary Examiner* — Thien F Tran
(74) *Attorney, Agent, or Firm* — Mark D. Wieczorek; Mayer & Williams PC

(57) ABSTRACT

Systems and methods are provided for at least partially automating generation of video clips chronicling a character's interaction with a video game. The same may combine automatic video clip generation with automatic or user-generated and/or user-edited or created narrative. Multiple video clips may be combined into a video reel prior to or subsequent to uploading the same to a file-sharing site. The video game may be a massive multiplayer online role-playing game.

25 Claims, 22 Drawing Sheets

SYSTEM AND METHOD FOR CREATING, EDITING, AND SHARING VIDEO CONTENT RELATING TO VIDEO GAME EVENTS

CROSS-REFERENCE TO RELATED APPLICATIONS

This application claims the benefit of U.S. Provisional Patent Application Ser. No. 61/062,309, filed Jan. 25, 2008, entitled "Automatic Gaming Video Highlights Reel".

This application is also a continuation-in-part of U.S. patent application Ser. No. 12/305,623, filed Dec. 18, 2008, entitled "System and Method Of Automatic Entry Creation For Blogs, Web Pages Or File Sharing Sites Based on Game Events," which is a 371 of International Patent Application Serial No. PCT/US2008/052362, filed Jan. 29, 2008, which claims the benefit of U.S. Provisional Patent Application Ser. No. 61/062,309, filed Jan. 25, 2008, entitled "Automatic Gaming Video Highlights Reel" and U.S. Provisional Patent Application Ser. No. 60/898,359, filed Jan. 29, 2007, entitled "Auto-Blogs."

All of the prior applications are owned by the assignee of the present invention and are incorporated herein by reference in their entireties.

BACKGROUND OF THE INVENTION

Players of video games, including multiplayer games and other multiuser systems, have historically desired to publicize their accomplishments and exploits, at least to friends and other interested parties. For example, arcade games have traditionally incorporated a "TOP SCORE" list whereby high-scoring users could enter their initials into the list if their score was one of the top scores achieved.

Other systems, including that disclosed in the application incorporated by reference above, provide ways to automatically generate content relating to a player's game characters or gameplay. The generated content is then uploaded to a personal blog or social networking site.

One of the most vivid depictions of game accomplishments is that provided by video, and video file-sharing sites include many clips relating to video games. Prior ways to generate these clips are generally manual, non-intuitive and are primarily suited to power users. In particular, power users of video games have often manually recorded spectacular or funny events that occurred during gameplay, and have then manually uploaded the same to video sharing sites, e.g., Crackle™. Some of these videos have gained massive popularity, and even celebrity, like the infamous "Leeroy Jenkins" video of an online session gone horribly wrong. That video was staged, but events like the one depicted happen quite often. As they are surprise events, no one participating is recording video.

SUMMARY OF THE INVENTION

Apparatus and methods are disclosed to implement a technique for preserving and sharing audio and/or video from online events, including impromptu events, which manual recording techniques would miss. In one implementation, a player uses a recording tool in an online environment that is part of an online game, such as a massively multiplayer online role playing game (MMORPG), e.g., EverQuest® offered by Sony Online Entertainment LLC. The recording tool automatically records video from the online game as it is being played and selects segments to be stored based on a set of parameters (such as events matching predetermined criteria, as defined by the player and/or the game provider), and/or by user input. In the former situation, the stored segment includes a portion recorded prior to the event. In the latter situation, the stored segment includes a portion recorded prior to the user input. The player can then view stored video, edit the stored video, and share the video with friends (e.g., by email, file-sharing, or uploading to a server, such as a video sharing service).

In more detail, the system and method provide an intuitive way to conveniently capture video clips related to gameplay, and allows for both automatic and manual capture triggers. Whether the trigger is automatic or manual, the invention stores the last several seconds of gameplay, e.g., 5-10 seconds, though the stored amount may vary based on system capabilities. With the manual trigger, if a player recognizes that an event has happened for which they desire a video record, the player manually activates the recording software, such as via an in-game button or keyboard hotkey. This activation stores the last several seconds of gameplay prior to the trigger, as well as the current gameplay, until the player stops recording. Recording may also stop automatically based on the occurrence of an event that matches a predetermined criterion. With an automatic trigger, one or more criteria are set that, upon their occurrence, activates the recording, including the storage of a prior time period, e.g., several seconds, of gameplay prior to the criterion occurrence. Suitable criteria may be the engagement in battle by a player character ("PC") of a selected non-player character ("NPC"), e.g., an enemy such as a "Raid Boss". In this case, the recording may stop based on user input or on automatic criteria, such as when a battle is concluded, e.g., when all Raid Bosses have been defeated or all player characters in a group are defeated.

Following the recording, various post-processing actions may occur. For example, if more than one player has been involved in the event, the system may stitch together various camera views into a "video reel" from the different players to allow viewers to see the event from different angles. The system may stitch together into a video reel events related to one or more friends of the player (if the system has access to a 'saved friends' or 'group' list). The system may also include in a video clip or reel titles and transitions, including guild and character names. Many other variations are possible, according to the many different ways a player may wish to view an event. Alternative implementations include that the raw video record of events may be captured on the server side or on the client side.

Following the post-processing actions, if any, a user interface may present an upload screen to the player to post their video automatically to a file-sharing site or the like, e.g., Crackle™. A title, description, and set of tags may be automatically populated, and edited by the player if desired.

In one aspect, the invention is directed towards a system for automatically recording and storing a video clip of events occurring in a video game. The system includes a cache for caching a video scene of events in a video game and an input module configured to receive a start indication from a user that a video clip is to be stored. Upon receipt of the start indication, at least a portion of the video scene stored in the cache is marked for transfer to a storage module as a video clip. The system also includes a storage module in which to store the video clip, such that the stored video clip includes at least a portion of video data cached prior to the start indication and at least a portion of video data cached or stored subsequent to the start indication.

Implementations of the invention may include one or more of the following. The system may further include a monitoring module for monitoring events occurring in a video game. If an event occurs that matches a predetermined criterion, the storage module is directed to store a video clip of the event from the cache, such that the stored video clip includes at least a portion of video data cached prior to the event and at least a portion of video data cached subsequent to the event. The system may further include an upload module, the upload module to upload one or more stored video clips to a blog, a web page, a social networking site, or a file-sharing site. The predetermined criteria may include one or more of the following: whether a subject player character has reached a predetermined geographic boundary within the multiplayer game; whether a subject player character has interacted with a predetermined non-player character or item; whether a subject player character has interacted with a predetermined player character or item; whether a subject player character has defeated a predetermined player character or non-player character; whether a subject player character has achieved a predetermined level, or changed levels, within the multiplayer game; or whether a subject player character has accumulated at least a predetermined number of points or items within the multiplayer game. The system may further comprise an editing module to enable editing of the one or more stored video clips prior to upload. The editing module may be employed to combine two or more video clips into a video reel. The upload module may upload metadata associated with the video clip to the blog, web page, social networking site, or file-sharing site. The upload module may be configured to accept metadata edits by a user.

In another aspect, the invention is directed towards a system for automatically recording and storing a video clip of events occurring in a video game. The system includes a cache for caching a video scene of events in a video game and a monitoring module for monitoring events occurring in the video game. If an event occurs that matches a predetermined criterion, a storage module is directed to store a video clip of the event from the cache, such that the stored video clip includes at least a portion of video data cached prior to the event and at least a portion of video data cached subsequent to the event. The system further includes a storage module in which to store the video clip.

Implementations of the invention may include one or more of the following. The system may further include an input module configured to receive a start indication from a user that a video clip is to be stored, such that upon receipt of the start indication, at least a portion of the video scene stored in the cache is marked for transfer to a storage module as a video clip. The system may further include an upload module, the upload module to upload one or more stored video clips to a blog, a web page, a social networking site, or a file-sharing site. The predetermined criteria may include those noted above as well as others. The system may further include an editing module, to enable editing of the one or more stored video clips prior to upload.

In another aspect, the invention is directed towards a method of automatically recording and storing a video clip of events occurring in a video game. The method includes caching video image data rendered by a video game. In one alternative, if a user indicates that the video image data is to be stored, then a video clip is stored corresponding to the video image data, the video clip beginning at a time prior to the user indication and ending at a time subsequent to the user indication. In another alternative, if an event occurs that matches a predetermined criterion, then the method includes storing a video clip corresponding to the video image data, the video clip beginning at a time prior to the event and ending at a time subsequent to the event. The method may further include transmitting a notification of the video clip, or the video clip itself, to one or more users. The method may further include uploading the stored video clip to a blog, a web page, a social networking site, or a file-sharing site. The predetermined criteria may include those noted above as well as others. The method may further comprise editing the stored video clip. At least two video clips may be stored, and the editing may combine the at least two video clips into a video reel. The method may further comprise uploading metadata associated with the video clip to the blog, web page, social networking site, or file-sharing site, and this may include accepting metadata edits from a user. In a further aspect, the invention is directed towards a computer-readable medium, containing instructions for causing a computer to implement the above method.

In yet another aspect, the invention is directed towards a computer-readable medium containing instructions for causing a computer to implement a method of automatically recording and storing a video clip of events occurring in a video game, the instructions causing the computing device to continuously capture video image data during gameplay of a video game. During the capture, a video clip is marked for storage based on a received input from a user, or a video clip is marked for storage based on the occurrence of an event that matches a predetermined criterion. Following the marking, the video clip is stored, such that the stored video clip includes at least a portion of a video scene that was rendered prior to the marking step.

Implementation of the invention may include one or more of the following. The instructions may further cause the computing device to upload the stored video clip to a blog, a web page, a social networking site, or a file-sharing site. At least two video clips may be stored, and the instructions may further cause the computing device to combine the at least two video clips into a video reel.

Advantages of the system and method may include one or more of the following. Users are provided with an easy-to-use video capture, editing, and uploading tool that allows them to share their gaming achievements and special moments with friends, enhancing their gameplay experience as well as publicizing the game they played. Events in gameplay are captured on video, the type of event predetermined or user selected. A "running" cache of video is maintained—upon occurrence of a trigger, the same is stored, from several seconds prior to the trigger to a variable time after the trigger. The variable time may be conditioned on user input or the occurrence of a predetermined criterion. The trigger may be manual or may be automatic. Automatic triggers may activate recording upon occurrence of a predetermined criterion, such as interaction with a selected NPC, e.g., a Raid Boss. Recorded content may be stored that has been flagged as being of interest. Post-processing may occur to combine scenes from various players, combine related scenes (such as all those involving a given 'friend' from a friends list), provide titles and transitions, etc. A user interface may be provided to allow easy uploading of the video to a file-sharing site.

Other advantages will be apparent to those of ordinary skill in the art, given the teachings and disclosures here.

BRIEF DESCRIPTION OF THE DRAWINGS

FIG. 21 illustrates various general recording options. On this screen, a user may disable the feature, insert a desired recording buffer length, or the like.

Like reference numerals indicate like elements throughout.

DETAILED DESCRIPTION

Figure 1:
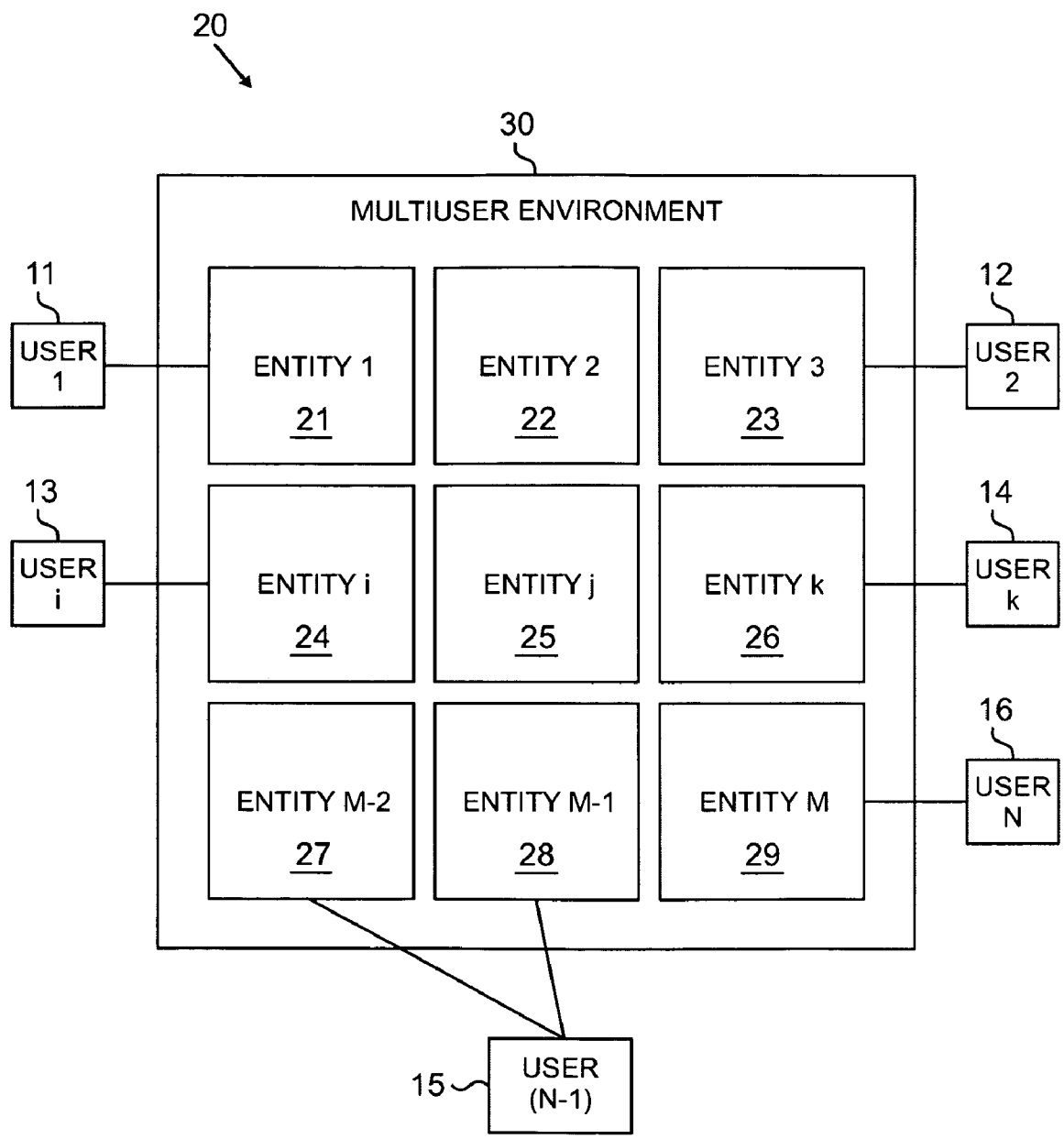
FIG. 1 illustrates a schematic depiction of a multiuser environment.

The following definitions are employed in this description.

A "multiuser environment" means any type of networked system in which one or more users interact with the environment and (if two or more users are involved) with each other. For example, in the case of a MMORPG, the multiuser environment is a multiplayer game. The term "user" refers to the individual. In some cases, the user is associated with an "entity" within the environment; in the case of a multiplayer game, users are usually associated with such an entity, where the entity is a "player character" ("PC") or avatar. A user may be associated with multiple player characters, as well as multiple multiplayer games. "Non-player characters" ("NPC") often exist within multiplayer games, and these are characters that are generated and operated by the environment itself, rather than being user-controlled. It is also noted that the environment within a multiplayer game is usually an important feature of the game, and interactions with the environment constitute a significant portion of gameplay. The environment is generally predetermined, with geographic features such as cities, building, mountains, bodies of water, rivers, caves, and the like. A "game engine", "software engine", or just "engine" renders the predetermined environment that is displayed by a user interface on the user's system. As the game engine has data stored about the geographic location of the PC within the environment, the game engine re-renders the view on the user interface as the PC moves. The term "subject PC" or "subject user" is employed to discuss a specific PC or user in relation to one or more other PCs or users, such as a group, guild, party, and so on.

A "blog" is a collection of content, and in some implementations may be placed on a web page or web site. The collection of content may have entries that correspond to the same general subject. In some implementations described here, the blog may be editable by a user. In others, the blog is not editable. A blog may be associated with the multiuser environment, and in a specific implementation may be associated with a multiplayer game. However, blogs may also be completely separate and unassociated with the multiplayer game. In the system and method described here, video reels or clips from events may be posted on a blog or alternatively transmitted to a social networking site or other file-sharing site, such as a video file-sharing site, rather than being posted on a blog.

An "event" broadly means any occurrence in which one or more of the variables that define an entity's status change. For example, in a multiplayer game, an event means any occurrence that changes one or more of a PC's status, location, demographics, accumulated goods and money, skills, talents, professions, and so on. Events may also refers to a PC performing a certain type of action, such as defeating a particular enemy, or even defeating a particular enemy in a particular way. Different types of games may employ different types of events. As may be seen, events may constitute numerous types of occurrences, and any type of event may be made to cause a video clip to be stored, subject only to the constraints of the particular implementation.

A "notable" or "trigger" event, or an "event that meets a predetermined criteria" or the like, generally refers to an event that is noteworthy, and thus may have a video clip created for it by the system and method. In a multiplayer game, such events may be, e.g., achieving a predetermined level (or an increase of any level at all), being the first PC to discover a particular geographic location or discover and/or interact with a particular NPC, accumulating a particular amount of money or points (e.g., experience points) in a given time, completing a quest, dungeon, or raid, defeating a particular enemy or class of enemy, defeating an enemy in a particular way, and so on. Such events may also be measured according to their priority in time, e.g., as being first with respect to the entire game community, first with respect to a given server, first of all PCs associated with a single player or user, and so on. An event that "pertains" to an entity, e.g., to a PC, is one that involves the PC in some way. For example, if a quest is completed by a group, the quest event would pertain to all members of the group, i.e., all PCs in the group. All members of the group may then have the quest completion be the subject of a video clip or video reel. If the group itself is an entity, e.g., if a guild has a page for video clip or video reel storage, or a blog on which video reels or video clips may be stored, then the quest completion may also be noted there.

"Event data" may video-related data, including screenshots, audio, video, and/or text and description, as well as combinations of these, about an event and which describe the event. Such event data may have a degree of user generation associated therewith. For example, the user may generate their own descriptive text or may edit automatically-generated text. In some implementations, the user may also choose views or angles at which screenshots or videos are shown. In some implementations, the user may "re-compose" the image, meaning to include PCs or NPCs or environmental features that were either not present or not aesthetically composed in the original screenshot. Recomposition may also include eliminating non-pertinent NPCs or environmental details to instead focus on those of greatest interest to the user. Event data may also include more objective information about what PCs and NPCs were involved in the event, which groups, guilds, and raid parties were involved in the event, the geographic location and environmental setting of the event, and any other data and/or metadata concerning the event.

"Automatic text creation" or "automatically-generated text (or description)" refers to text that is pre-set or is built from predefined components, and is either used in an entry per se or is made editable by a user. For example, if a quest is completed, there is often text that would be appropriate to display no matter how the PC completed the quest. The same is true if the PC discovers a particular geographic location, item, or PC or NPC, achieves a certain level, and so on.

To "automatically" perform an action is to cause the action to occur, without user intervention, upon the condition of a trigger. For example, a video clip may be automatically stored from a cache upon the occurrence of an event that meets a predetermined criterion. The video clip may then be automatically caused to appear on a file-sharing site or other such forum.

An "entry" is a "media item" that describes an event that meets a predetermined criteria, where the media item may include one or more of text, images, video, and so on. An entry is created by a software module, described below, and may be posted to a blog, social networking site, or file-sharing site, either automatically or upon suitable indication by a user. An entry may also be made manipulable by a user, such as by translating the same into XML format. In this way, the user may copy the same into a blog manually. Such functionality may be particularly pertinent if a user desires to copy automatically or semi-automatically-created entries into a blog that has no automatic posting capabilities. An exemplary blog of this nature may be a life-journal-type blog or a blog unrelated to the multiuser environment. To "generate" an entry means to employ at least a subset of the event data to form code that, when posted or otherwise published, conveys information about the event to other users.

A "video clip" entry is a sequence of video footage. The sequence or "video scene" is not necessarily from a single 'shot' nor need the same be continuous, but in many cases it is. A video scene may include events that match more than one predetermined criterion, and in this case multiple video clips may be stored, and the same may overlap in the video scenes depicted. A video clip may be edited, subject to recomposition, or the like. It will be understood that the term "video clip" can also refer to audio data stored with or within the clip. A video reel entry is a group of video clips that are related by a reel criterion or which are manually chosen by a user to be grouped together. For example, a video reel may include a collection of video clips in which a user caused a PC to defeat another PC in a particularly interesting way. A video reel may also include video clips from the several members of a guild or other group, stitched together to illustrate views of an event from several different angles. Numerous other types of video reels will be apparent.

A "social networking site" is an online community of users usually connected via the Internet. The users can typically interact with each other via messaging and email, and can express preferences to each other about various interests and groups. An exemplary social networking site is Facebook®. Many of these have facilities for sharing video or image data.

A video or image "file-sharing site" is a website that primarily allows users to share multimedia data, such as video clips or reels or images. For example, Crackle™ allows users to share videos. Other such sites may include guild websites, which often serve as bulletin boards for members of certain "guilds" or groups within MMORPGs. Guild websites may be employed as an upload target to host videos of interest to guild members.

A "group" is an arbitrary grouping or list of assembly of PCs, such as a guild, friends' group, party, raid party, and so on. A group may have its own blog or other such web page associated therewith. When an event is made the subject of an entry, or a video clip or reel is posted, messages may be sent to all members of the group to notify them of the entry.

Referring to FIG. 1, a multiuser arrangement 20 is shown having a multiuser environment 30. A plurality of users [denoted users 1, 2, i, k, (N−1), and N] are shown with corresponding reference blocks 11-16, respectively. More or less users may be present in any given implementation. In the case of a small office implementation, the number N may be, e.g., less than 10. In the case of an MMORPG, the number N may be, e.g., several million. In the implementation of FIG. 1, each user controls one or more entities. In other implementations, the user may act directly on applications and data and thus an entity proxy may be unnecessary. In the implementation of FIG. 1, entities 1, 2, 3, i, j, k, M−2, M−1, and M are shown with corresponding reference blocks 21-29, respectively. As above, more or less entities may be present in any given implementation. In the case of an MMORPG, the number M may be, e.g., several million. A user may control more than one entity. For example, user 15 controls entity 27 and entity 28. Conversely, some entities may not be controlled by users. For example, entities 22 and 25 are not controlled by users.

Figure 2:
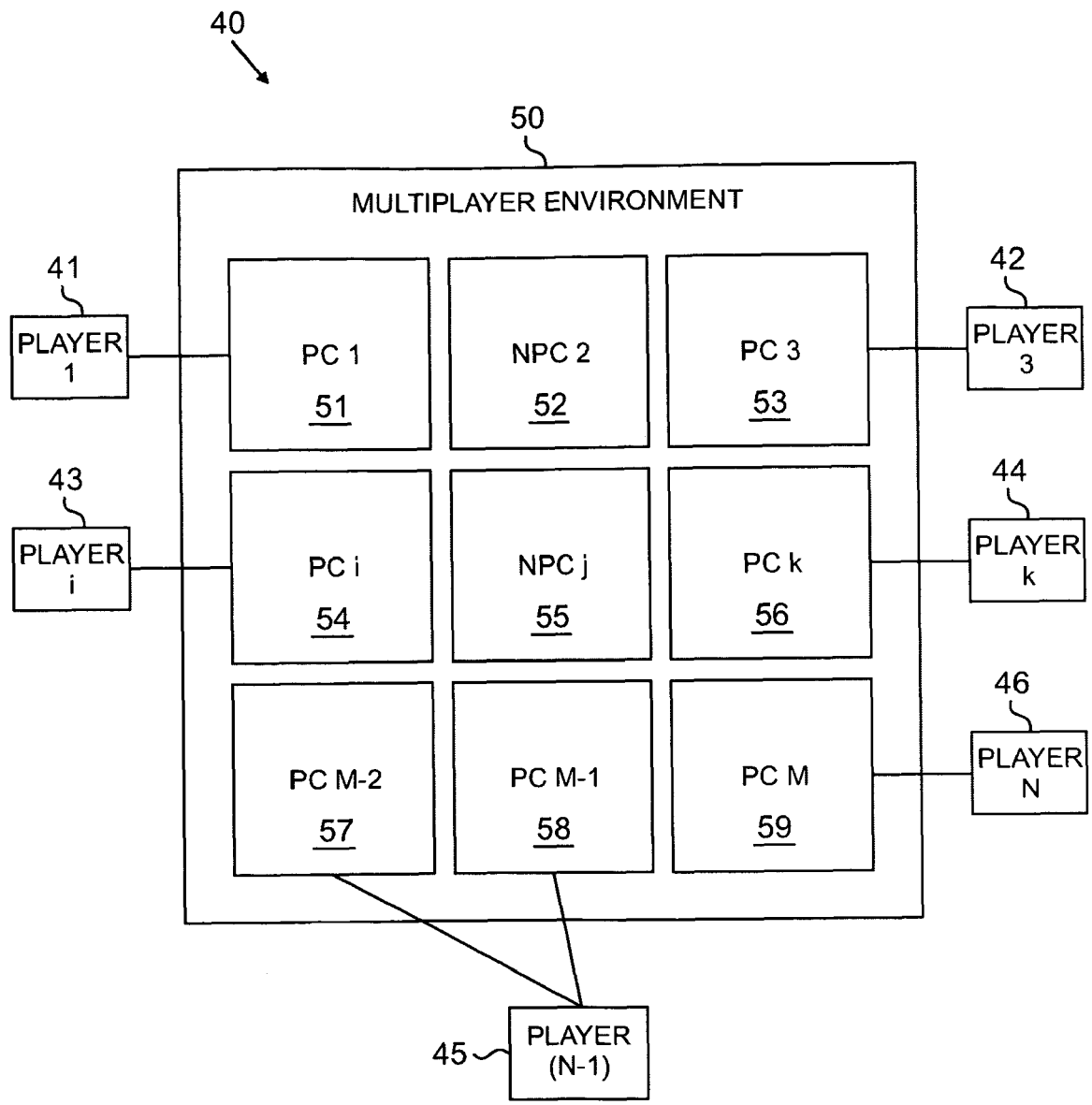
FIG. 2 illustrates a schematic depiction of a multiplayer game.

Referring to FIG. 2, the multiuser environment is shown as made specific to a multiplayer game. In particular, a multiplayer game arrangement 40 includes a multiplayer environment 50 and a set of players or users 41-46 (denoted player 1, player 2, player i, player k, player N−1, and player N, respectively). The N players control the PCs, which form a subset of the M entities. The M entities are denoted in an exemplary fashion as PC 1, NPC 2, PC 3, PC i, NPC j, PC k, PC M−2, PC M−1, and PC M, and by reference blocks 51-59, respectively. A player may control more than one PC. For example, player 45 controls PCs M−2 and M−1. NPCs 52 and 55 are controlled by the game engine described below. In the example of FIG. 2, the remainder of the players each control one PC. Of course, more or less players, and more or less PCs and NPCs, may be employed in any given multiplayer game.

Thus, there are N players and M entities formed by a combination of PCs and NPCs. M is generally greater than N.

Figure 3:
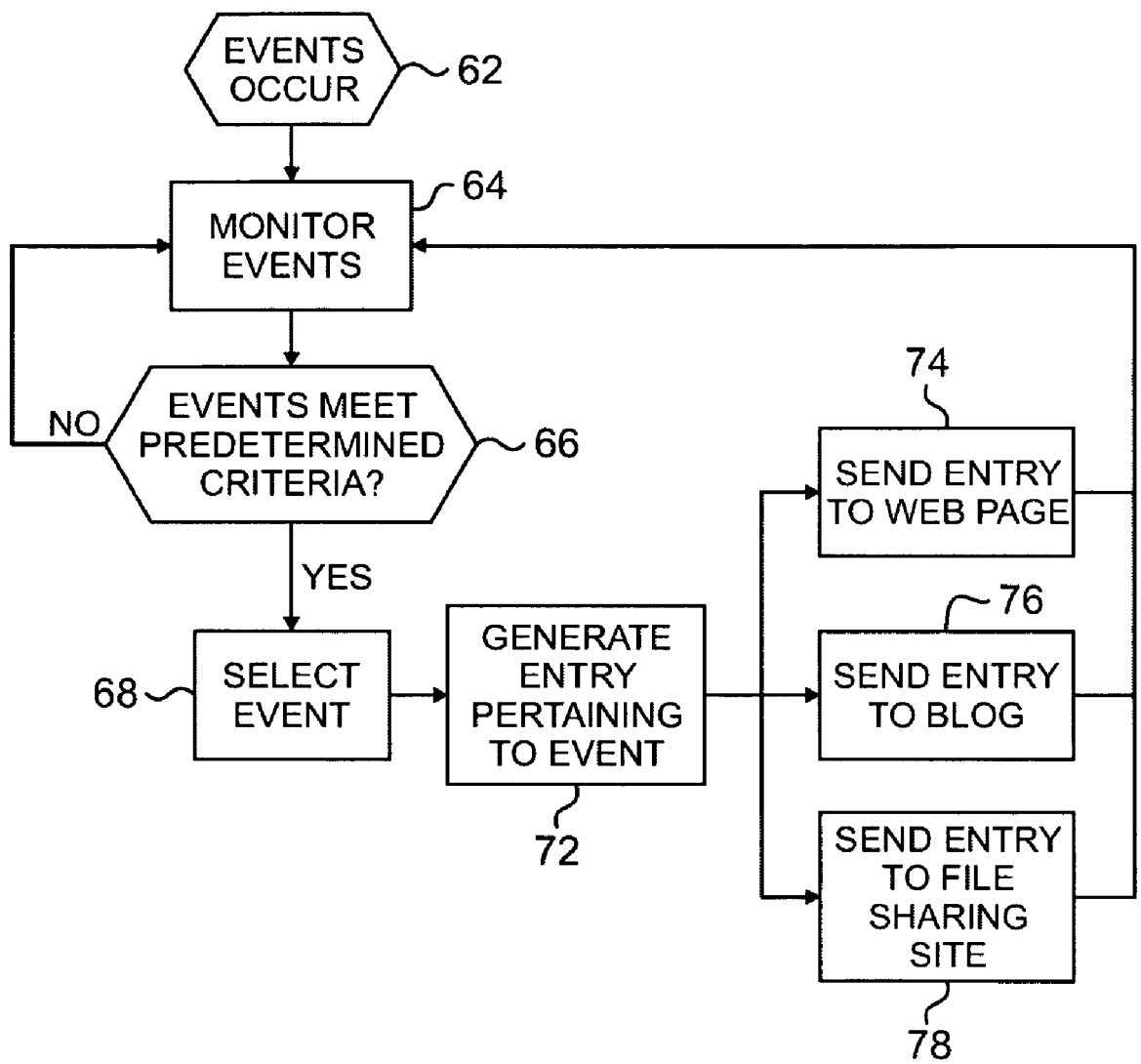
FIG. 3 is a flowchart depicting a method for automatically posting an entry corresponding to an event.

FIG. 3 illustrates a flowchart depicting a method 60 of automatically generating at least a partial entry for a blog or other web page. It is first noted that in any multiuser environment or multiplayer game, events practically continuously occur (step 62). Such events may be any noted above, or the like, with most generally not rising to the level of suitability for a blog entry or web page notation. However, the events are monitored (step 64). A determination is made as to whether a monitored event meets a predetermined criteria (step 66). For example, the monitored event may be noteworthy in some way, and may thus rise to the level of being a trigger event. Such an event is then made to be the subject of an entry in a blog or other web page.

If a given event fails to meet the predetermined criteria, then the method simply continues to monitor events. If a given event meets the predetermined criteria, then the event is selected (step 68). An entry is generated pertaining to the event (step 72). The entry may then be sent to a web page (step 74), to a blog (step 76), or to a file-sharing site (step 78). In alternate implementations, the entry may be sent to any other location or device. For example, the entry may be formatted as an instant message, SMS, or email, and sent to a mobile phone, PDA, or a separate computer system. In other words, the entry need not be sent to a blog.

In any case, the method may then repeat as shown. Of course, during entry generation, the system and method may continue to monitor events that may occur in the meantime. It is additionally noted that entries generated may be manipulated and employed by the user in any desired fashion, instead of being transmitted to a web site, blog, file-sharing site, and so on.

Figure 4:
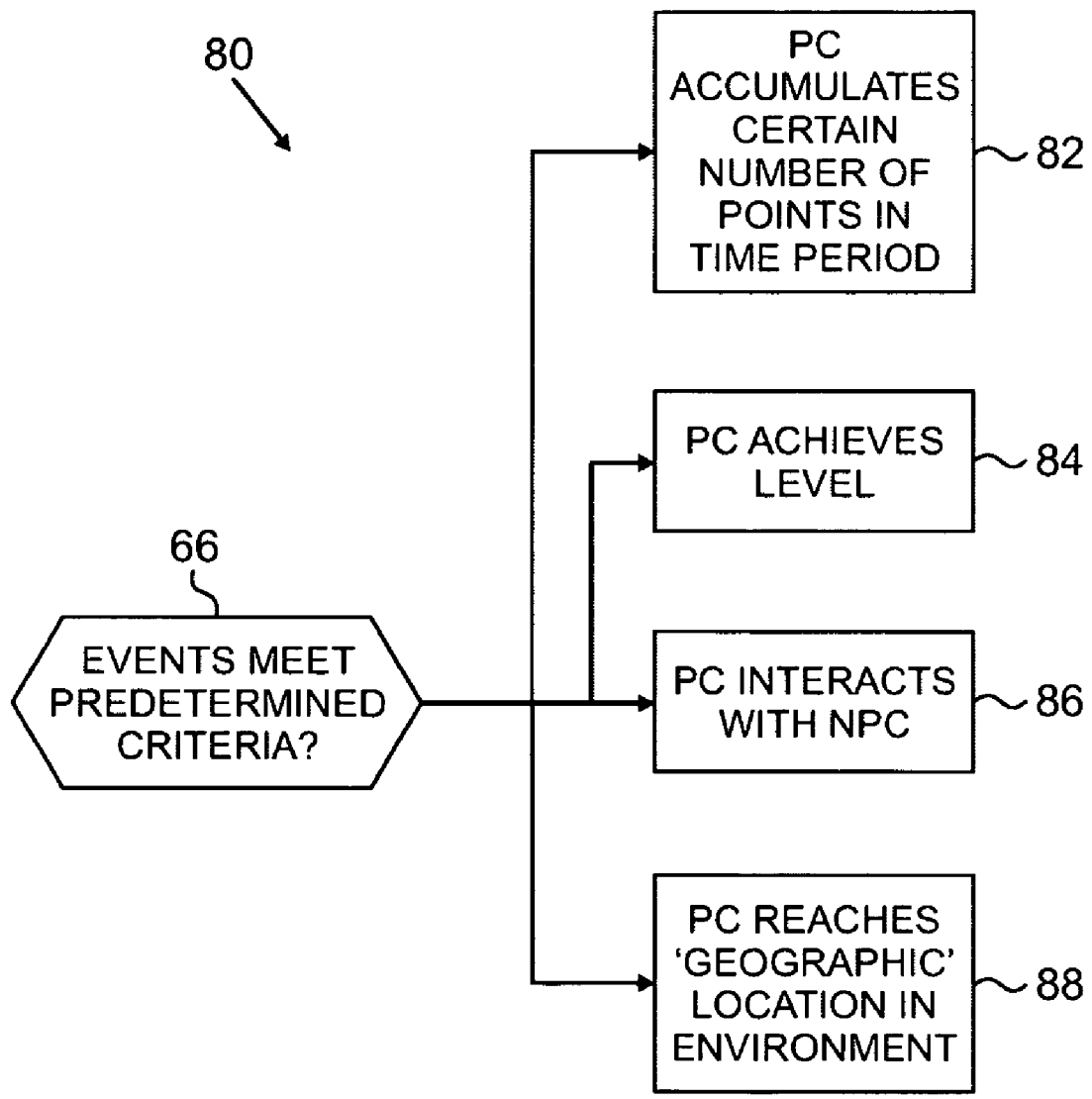
FIG. 4 is a flowchart depicting details of a step within FIG. 3.

FIG. 4 is a flowchart 80 illustrating additional details of step 66. In particular, the step of judging whether an event meets a predetermined criteria may include judging whether a variety of actions have occurred. One type of event that may give rise to an entry is that a PC accumulated a certain number of points in a time period, e.g., a certain number of experience points, money, coin, etc. (step 82). The threshold level may be set by the user, by the system, or via any other means. Another type of event that may give rise to an entry being generated is that a PC achieves a given level. In this connection, it is noted that PCs generally rise in level as experience points are gained, quests are completed, and so on. An entry may be created upon each level completion or upon notable level achievements such as level 20, 40, 60, and so on. In another implementation, an entry may be created when a PC changes their status in any other way, e.g., a change or increase in skill or talents.

A further type of event that may result or cause entry generation is when a PC interacts with a predetermined NPC (step 86). In particular, a given NPC may be deemed special or noteworthy, and PC interaction with the same may mark a certain achievement. Such an interaction may be deemed to have occurred when a PC targets the NPC, is located within a predetermined radius of the NPC (and which may vary based on level, level differences, or any other parameter), or via any other measure. Rather than an NPC, the entry generation may be triggered by a PC's interaction with another PC. In any case, this achievement may then be chronicled with a blog entry as discussed elsewhere.

Another type of event that may result or cause entry generation is when a PC reaches or is otherwise geographically coincident with a given boundary or geographic location within the virtual game environment (step 88). For example, if a PC reaches a particular city, gate, landmark, dungeon, or other geographic location, that event may be selected for event generation.

Those of ordinary skill in the art will recognize that, given this disclosure and teaching, numerous other types of events, as dictated by the developer, may also give rise to a generation of an entry. For example, finding a predetermined item or environment detail may be cause for entry generation. Defeating a given NPC or PC when the subject PC's health is at a very low level (e.g., 5% or less) may give rise to generation of an entry. Defeating a particular PC (as determined and set by the user, e.g., a friend) may cause an entry to be generated. In some cases, humorous events may be subjects of entries. For example, a defeat by a particularly notorious NPC may be made into an entry, and in this or other circumstances, automatic notification of a user's friends may be especially appropriate. Another trigger for entry generation may be by the system monitoring chat channels, such as guild or raid channels, and creating an entry upon determination that a keyword has been used, e.g. the name of a specific NPC. In an audio chat channel, the system may employ voice recognition to determine if such a keyword has been spoken.

In some implementations, users may provide input as to what triggers are employed, and where generated entries are sent. For example, users may indicate that entries should be created whenever their PC achieves ten levels, e.g., upon PC achievement of levels 10, 20, 30, etc. Alternatively, a user may desire entry generation whenever their PC achieves a new level. Users may also customize the entry transmission. For example, a user may configuration the system such that upon completion of a specific quest, a chosen group of users are notified; the same user may configure the system so that, upon achieving a new level, no users are notified but a small entry in the PC's blog page is generated to memorialize the event.

Figure 5:
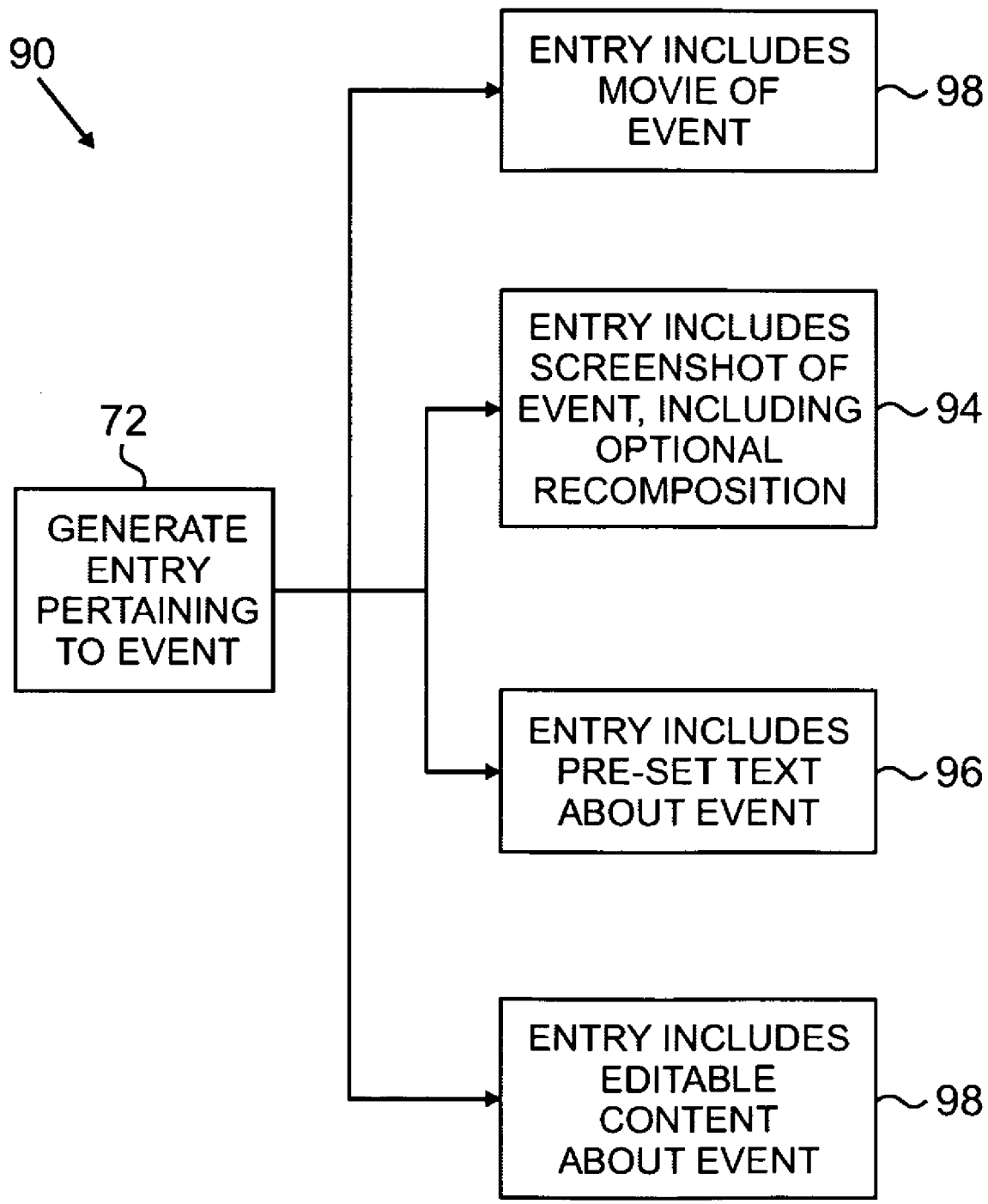
FIG. 5 is a flowchart depicting details of another step within FIG. 3.

FIG. 5 is a flowchart 90 illustrating additional details of step 72. In particular, the step of generating an entry pertaining to an event may include a number of actions. One type of entry generation is to generate an entry that includes a video or movie of an event (step 92). For example, an entry may contain a video clip for downloading, streaming, or otherwise viewing. Alternatively, the entry may contain a link to a site where the video may be viewed or downloaded. In any case, the video may contain a predetermined number of seconds or minutes of video, including times before and after the actual occurrence of the event. The amount of video may be set by the user or may be automatically provided by the system, and may be made dependent on the system resources available to the user.

Another type of entry generation is to generate an entry that includes a screenshot of the event (step 94). The screenshot may be as simple as the actual screenshot of the event as it occurred, or a step of recomposition may occur. The recomposition may include, as noted above, inclusion of PCs or NPCs who were not in the actual screenshot as seen by the player, exclusion of undesired PCs or NPCs, exclusion or inclusion of environment scenery, re-posed characters so that the same appear in a more aesthetic fashion, and so on. It is noted that recomposition may also be performed for videos and movies of the event.

Yet a further type of entry generation is to generate an entry that includes a pre-set text about the event (step 96). The text may be made editable by the user via a suitable edit screen (step 98). In this way, the user may edit the pre-set text, add to it, or entirely replace it. A pop-up screen may be employed to allow user selection of several pre-set text options. The pre-set text may vary per character. In this way, the pre-set text may accommodate differences in PC races, classes, professions, genders, etc.

Those of ordinary skill in the art will recognize that, given this disclosure and teaching, numerous other types of entry generation may also be employed.

Figure 6:
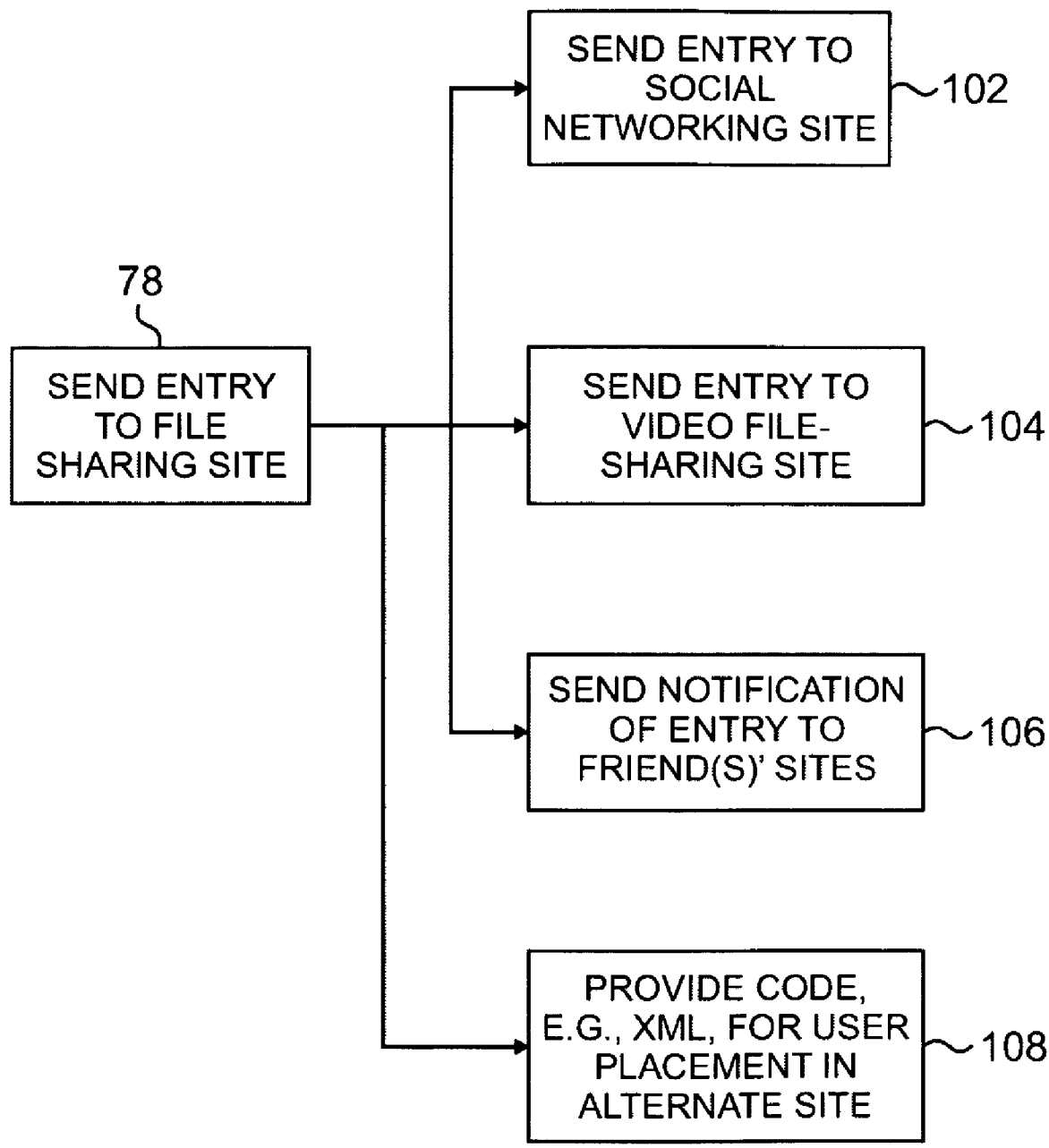
FIG. 6 is a flowchart depicting details of a further step within FIG. 3.

FIG. 6 is a flowchart 100 illustrating additional details of step 78. In particular, the step of sending an entry to a file-sharing site may include a number of actions. One type of sending includes sending the entry to a social networking site (step 102), e.g., Crackle™. This step may occur automatically, the user may be prompted for such a sending, or the user may manually copy generated code into an appropriate form on the file-sharing site. Another type of sending may include sending an entry to a video (or other such audio, image or text) file-sharing site (step 104). This is in some ways similar to step 102, as social networking sites often allow uploaded multimedia files.

FIG. 6 also shows that a notification of the entry may be sent to users associated with the subject player (step 106). In particular, rather than the entry itself, a notification of the same may be sent to a group of users, if the subject player has constructed such a group on the applicable system. For example, a multiplayer game may have a corresponding blog system for maintaining blogs and blog entries about the PCs in the game. Users may provide information to the blog system about who they would like to be notified of events. The user may provide several lists, e.g., a friends list, a guild list, a raid party list, and other such groupings. When an entry is posted, each user on the one or more lists (as dictated by the settings controlled by the subject player) may receive an email, an SMS, in-game mail, or other such notification of the entry posting.

In the same way, each group may have created for them a blog or other site. For example, a guild may have their own blog. When a triggering event happens to the guild, the event may be made an entry on the guild blog. The same may be true of a raid party, a group of friends, a group of people with similar interests, and so on.

The transmission or sending of an entry in an automatic fashion to a blog or other file-sharing site may occur on any number of schedules. For example, the sending may occur as soon as the event is selected and an entry is generated. Alternatively, the entry may be sent at the end of a play session. In other implementations, the entry may be sent once a day on a regular basis, once a week, etc.

The system and method may also generate and provide code for a user to manually copy into an appropriate form or other such editor on a file-sharing site (step 108). The code may be provided in, e.g., XML format, for such purposes. Of course, any other such code may also be provided. The user could use the provided code to insert an entry into a web page, file-sharing site, blog, or for any other purpose. Any image or video or other multimedia files may be embedded or linked-to or provided in any other suitable manner.

Figure 7:
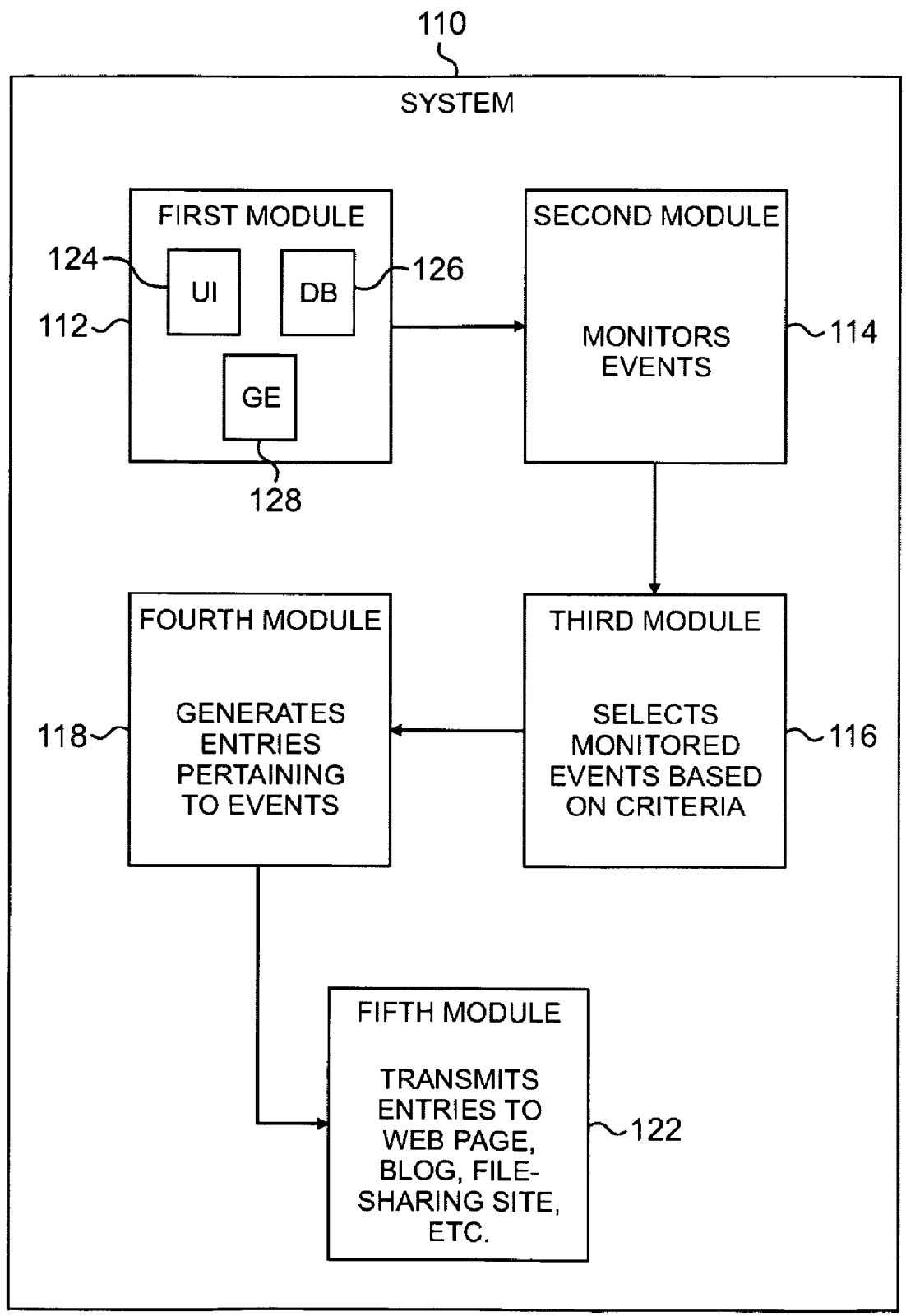
FIG. 7 is a schematic diagram of a system for automatically posting an entry corresponding to an event.

FIG. 7 shows an arrangement 110 which may implement the system for automatically generating at least a partial entry for a blog or other web page. The arrangement includes a first module 112, a second module 114, a third module 116, a fourth module 118, and a fifth module 122. The modules may be combined in any number of combinations as will be clear to one of ordinary skill in the art given this teaching and disclosure. The first module 112 may include a user interface module 124, a database module 126, and a software or game engine module 128. Generally, the first module operates much of the multiuser environment or multiplayer game.

The second module 114 may serve to monitor the events that occur, e.g., as part of the operation of game engine 128. The second module 114 may perform this task in a number of ways. For example, the second module may review occurring events against a list of predetermined criteria. When a event is found that matches or exceeds a predetermined criteria (depending on the nature of the event), then that event may be selected. The event may be selected by the third module 116, or by the second module 114. As noted above, the second module 114 and the third module 116 are shown as separate modules in FIG. 7, but the same may be combined into a single module. Further as noted, all of the modules may be combined into one or more software applications.

A fourth module 118 reviews the selected events and creates an entry corresponding to the same. For example, the fourth module 118 may retrieve (if necessary) and store a video of the event, e.g., 10 seconds before and 10 seconds after, as well as place the same into a blog entry format. The fourth module 118 may retrieve and place into a blog entry a screenshot of the event, and may provide the user with options for re-composing the image portrayed by the screenshot. For example, the fourth module 118 may provide a drop-down list of the PC's group members, or alternatively of the PCs and NPCs within a set radius of the event, and may give the user the option to include or delete any of the named character's images from the screenshot. In many cases, if the event corresponds to a defeat of a particular NPC or PC, the user may wish to have the PCs standing atop or adjacent the NPC or PC to signify their victory. Pop-up or drop-down lists may also be provided for inclusion or exclusion of environmental details.

The fourth module 118 may also retrieve and place into a blog entry preset, predetermined, or automatic text about an event. Further, the fourth module 118 may provide an edit screen to a user so that automatic text or a screenshot may be edited.

In any case, the fourth module 118 formats the video, audio, screenshot image, text, and any other multimedia file corresponding to the event in such a way that the same may be the subject of a blog entry, file-sharing site, and so on.

The fifth module 122 transmits the entries to a web page, blog, file-sharing site, or alternatively provides ready-made code, e.g., XML code, so that the user can cut-and-paste the same into any type of file or web page desired. In one implementation, the fifth module provides a series of radio buttons (or other indicators) allowing the user to choose whether they wish to post the entry to a file-sharing site such as Crackle™, create an XML code for later posting, or post the entry on a PC's blog site. In another implementation, a settings panel or menu may allow the user to indicate that any or all future entries be posted to the desired site, rather than having the user choose for each individual entry.

The data collected using the above-described system may be stored on the client side, on the server side, or via a combination of client-side and server-side storage.

One of ordinary skill in the art will see numerous variations given this teaching and disclosure. For example, some events may be considered group or guild events, and others solo or individual events. The first may be posted to a group or guild blog and the latter to an individual PC's blog. Some events that are particularly visually interesting may be posted to a video file-sharing sites. Others, that are of great interest but are not necessarily visually interesting, such as a character reaching level 60 or 70, may be listed on a PC's blog but with no video of the event necessarily uploaded. Decisions as to where and what to post may be fully or partially automated given user-set or alternatively default criteria, or may be manual, e.g., made on a per-entry basis.

One of ordinary skill in the art will recognize that the various modules may be combined as noted, and may be implemented in any combination of hardware, software, and so on. Further, in many multiplayer games, due to the number of players and bandwidth requirements, each arrangement 110 may be duplicated any number of times on any number of servers.

Figure 8:
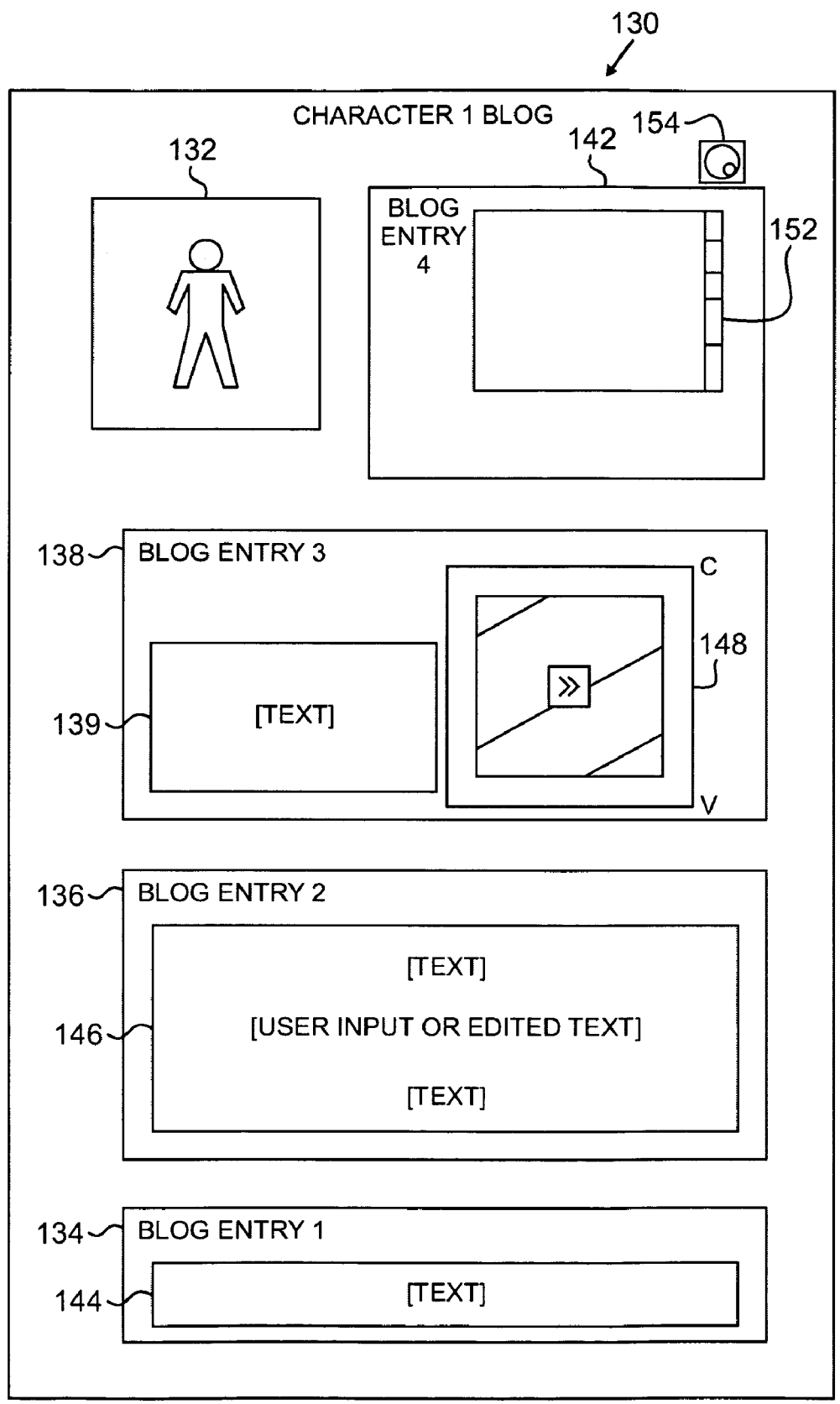
FIG. 8 illustrates an exemplary blog page for a character.

FIG. 8 shows a blog-type web page 130 for a subject PC "character 1". An image 132 of character 1 may be displayed, and this image may be chosen by the user or may be a default image provided or derived from the image files within the MMORPG. A series of blog entries 1-4 are shown, i.e., entries 134-142. Entry 134 is shown with pre-set text 144; entry 134 has no editable or edited text within. Entry 136 is shown with user-inputted, edited, or editable text 146. Entry 138 is shown with a video 148 and text 139, the latter of which may be pre-set and/or editable as described previously. Clicking the play button ">>" starts playback, e.g., streaming, of the video of the event. Finally, entry 142 has a screenshot 152 disposed thereon. The screenshot may be of any of the types listed above, including re-composed screenshots.

FIG. 8 also has a search button 154. Other web page tools may also be provided (not shown).

Of course, the blog 130 may have more or less entries than are shown in FIG. 8.

The blog of a group, PC, user, and so on, may be accessible by users using the internet or other network but may also be made accessible in-game. For example, users of the multiplayer game may be given a menu option, button, or other in-game tool to directly access PC, guild, or other such blogs. These in-game blogs may be the same as those described above, or may be shortened, summarized, abstracted, or otherwise abbreviated versions of the same. The same may be accessible in a separate blog view or via numerous other ways. For example, selecting a PC in a given way may display that PC's blog. Similarly, selected a guild name or banner may display that guild's blog. Other variations will be apparent given this teaching and disclsoure.

Figure 9:
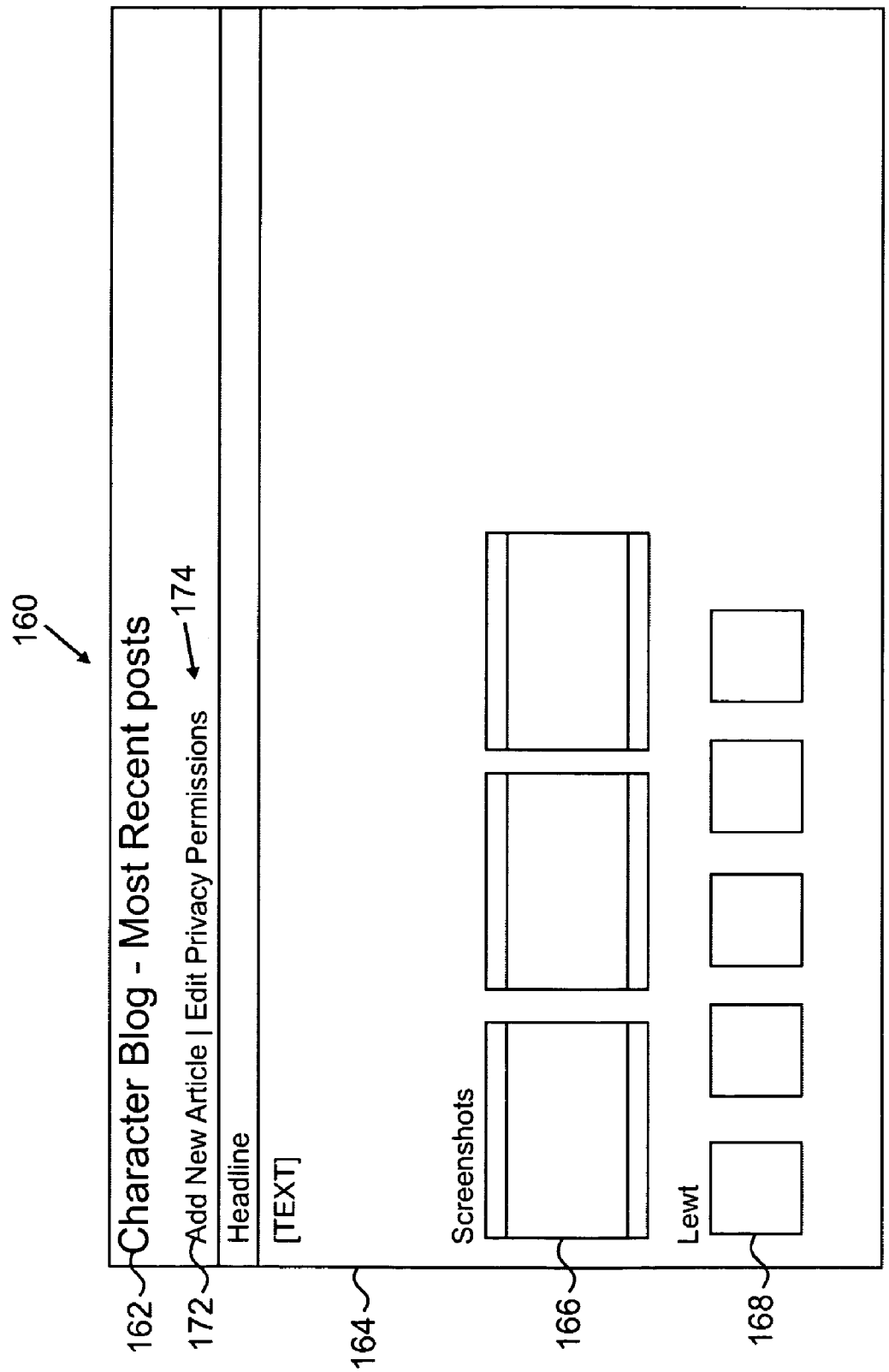
FIG. 9 illustrates another exemplary blog page for a character.

FIG. 9 shows another implementation of a character blog. This character blog 160 incorporates a title line 162, text 164 corresponding to a headline (which may pertain to the most recent post about the character), one or more screenshots 166 (which may pertain to the latest exploits of the PC), and icons 168 corresponding to the virtual goods received via the character's exploits. Numerous other items pertaining to the character may also be posted, as will be understood. Various web tools may also be provided, as are indicated by buttons 172 and 174.

Figure 10:
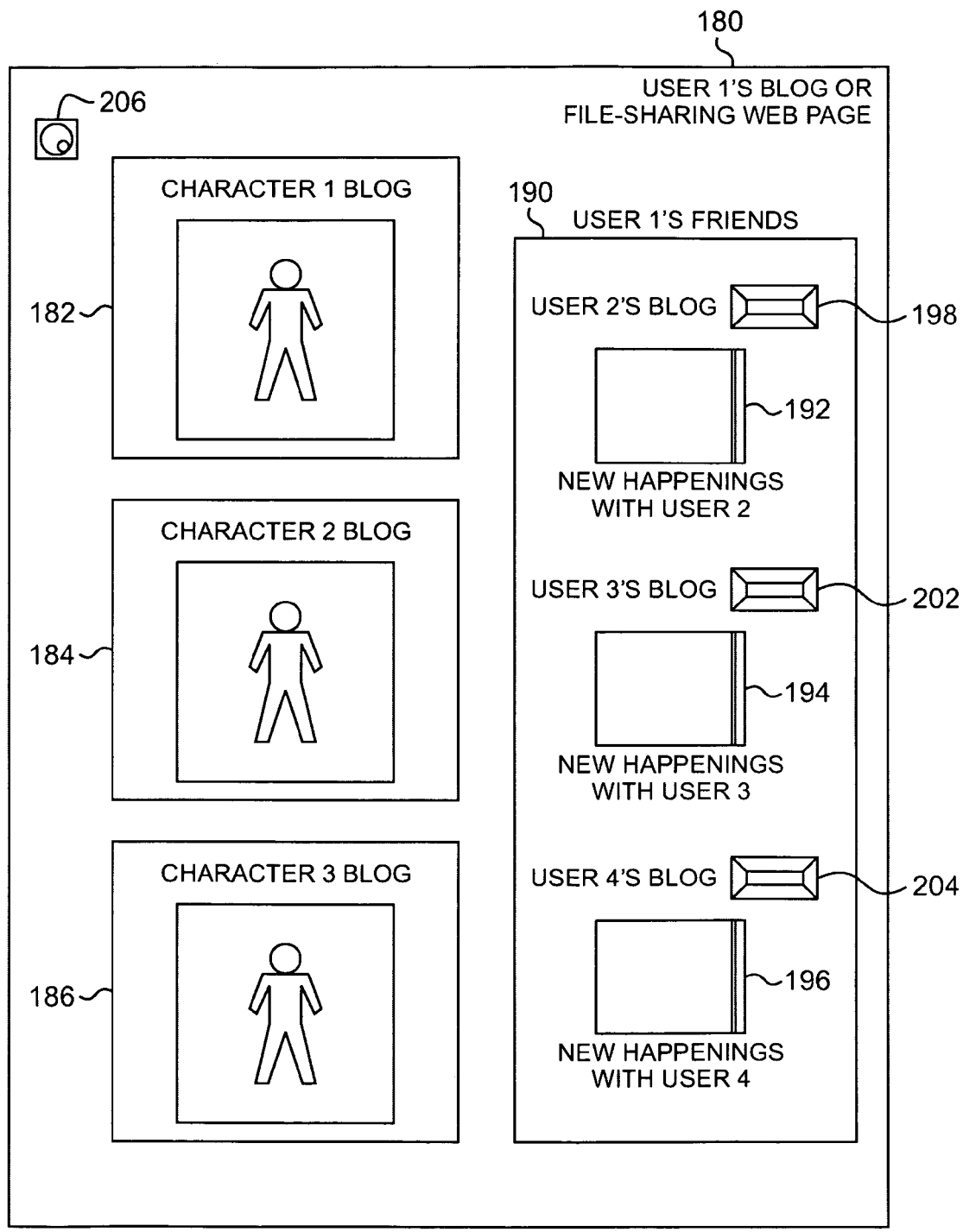
FIG. 10 illustrates a blog page for a user, indicating several characters and several friends or associated users.

FIG. 10 shows another implementation of a user blog or file-sharing web page 180. This implementation includes several buttons linking the page 180 to various PCs controlled by the user ("user 1"). FIG. 10 shows buttons 182-186 which perform this function. In this example, images of the characters are portrayed on the buttons. These characters may be for one or more multiplayer games played by the user. The page 180 further has a section 190 which links to friends' or users' pages associated with the user of page 180. For example, the user may choose in a setup page to have these friends' linked-to in this section, or the same may be automatically set-up as being part of the user's guild, group, and so on. FIG. 10 shows buttons 198-204 which link to pages for user 2, user 3, and user 4. FIG. 10 also shows an image corresponding to the latest postings for these users. The image may be a screenshot, text, video, etc. If a video, placing the cursor over the image may result in playback of the video. This layout is purely exemplary, and numerous variations may be employed. For example, the page may only list characters of user 1, or may list only friends of user 1. The number of characters and friends may range from none to virtually any number.

The above discloses a method and system for automatically creating an entry for a blog or file-sharing site. Below is described a specific implementation for creating, editing, and sharing a video clip or video reel of video clips that can visually chronicle a player's exploits in a video game and which can capture moments missed by manual recording techniques.

Figure 11:
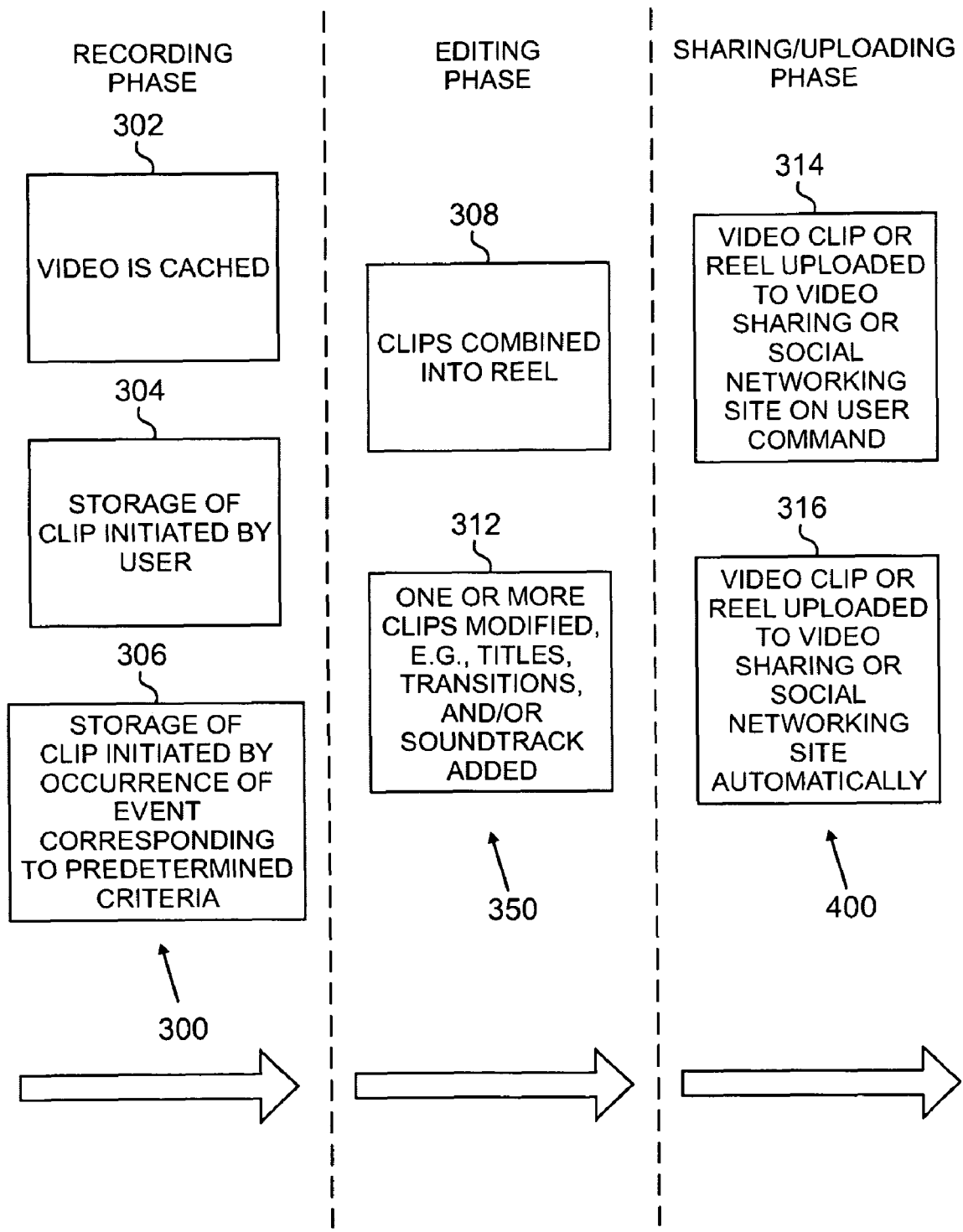
FIG. 11 illustrates three exemplary stages of recording, editing, and sharing video clips and/or reels.

Referring to FIG. 11, three phases or stages are shown in a system and method for automatic video clip and reel creation, editing, and sharing. A game engine renders audio and video for enjoyment by a player. In the system and method, the rendered audio and video is cached, such that a running cache is provided for any given point in time, the cache including audio and video rendered prior to the given point in time. Upon either user input or the occurrence of an event that matches a predetermined criterion, the cached audio and video is marked for storage as a video clip. Stored video clips may be edited, and related video clips may be combined into a video reel. Video clips or reels may be shared or uploaded to a file-sharing or other site or otherwise shared as will be described.

In more detail, a first phase 300 is a video recording phase. In this phase, rendered audio and video, hereinafter occasionally termed just "video" for clarity, is cached (step 302) continuously while a player is playing a video game. The cache may be in any sort of memory or buffer, and may store a constant duration of video or the length of time stored may be variable. For example, if the monitored game is determined to have a high amount of action, e.g., via determination of hits points lost, character movement, or via any other measure, then the size of the cache may be increased and in this way include more action. In many cases, however, it may be sufficient for the cache to include a constant length of time, e.g., 5 or 10 seconds, in gameplay.

The recording phase 300 also includes a step of marking a cached video scene for storage. The storage may be of the entirety of the cache contents or may be of a subset of the cache contents. The storage may occur in one of two ways. Other ways will also be apparent, given this teaching.

First, storage may be initiated by user input (step 304). In addition, storage may be initiated by the occurrence of an event that matches a predetermined criterion (step 306). Besides ways to indicate that a video clip should start at a given point in time, an ending time of the video clip may be indicated.

Following the recording phase 300, a next phase is an editing phase 350. In the editing phase 350, as will be described in greater detail below, video clips associated with one or more PCs may be combined into video reels (step 308), and the clips and reels themselves may be edited, recomposed, touched-up, or otherwise modified (step 312). For example, titles and transitions may be added, and one or more soundtracks added to enhance the overall effect of the clip or reel on the viewer.

Following the editing phase 350, a next phase is a sharing or uploading phase 400. In this phase, video clips and video reels may be uploaded to file-sharing sites, social networking sites, or otherwise made available to others. The phase 400 includes steps of sharing or uploading the video clip or video reel upon user command (step 314) or automatically (step 316). In the user command option, the user is provided with the ability to determine when the video clip or video reel is shared or uploaded. This ability requires that the user generally perform additional actions, but ensures that the user has additional control over the timing of the sharing or uploading. In the automatic option, users need not perform any additional steps. The video clips or video reels are automatically shared or uploaded with little or no user intervention. Using such an automatic feature, users may be assured that their video clips and video reels are available for viewing by others in a particularly convenient manner.

Figure 12:
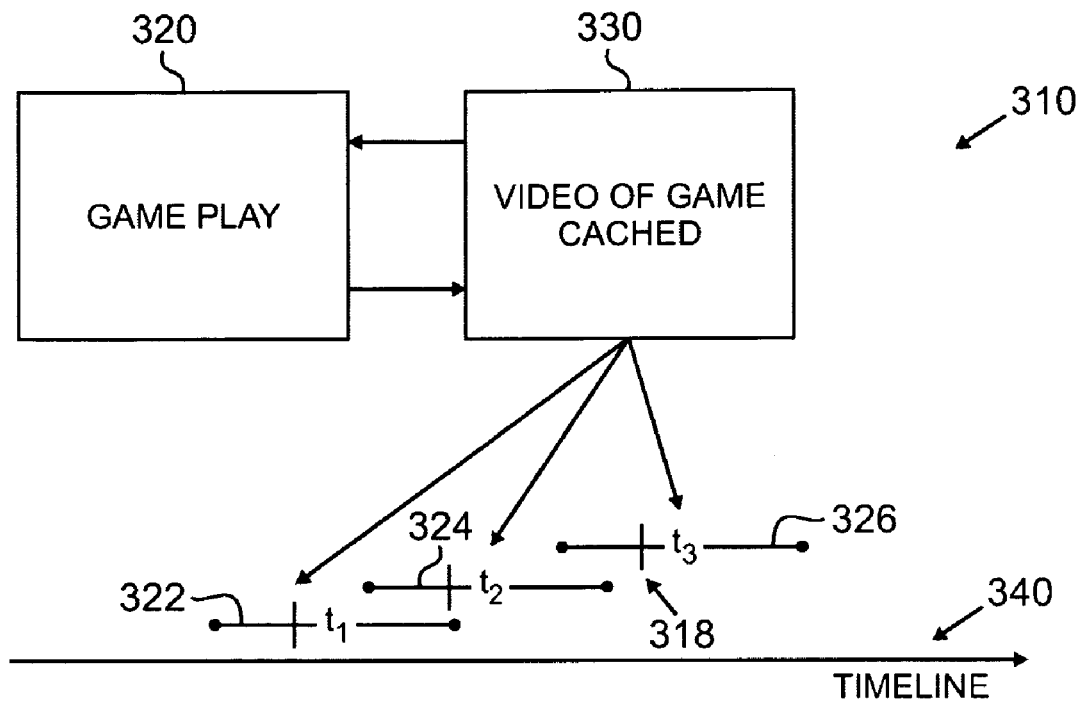
FIG. 12 illustrates a timeline showing sequential caching of video scenes.

Returning to the phase 300 of capture and recording, FIG. 12 illustrates a schematic depiction of the continuous caching method 310. Game play occurs (step 320), and a video of the game play is cached (step 330). Plotted on a timeline 340 are three sequential and partially overlapping video scenes 318 as may be sequentially and continuously cached. A first video scene 322 starts and lasts a duration $t_1$. A second video scene 324 starts a short time after the first video scene starts, and lasts a duration $t_2$.

While the second video scene 324 is shown starting a short time after the first video scene, it will be understood that generally the caching is a continuous and "running" cache: when a new interval of time is captured, an interval of time is released or erased from the cache contents. That is, only the latest rendered video and audio are saved. In one implementation, a second video scene begins a period of time after the first video scene, where the period of time is very short, e.g., the inverse of the frame refresh rate for the video game.

FIG. 12 also shows a third video scene 326, which starts a short time after the second video scene starts, and lasts a duration $t_3$. The first video scene is seen to overlap with the second video scene, and the second video scene is seen to overlap with the third video scene.

Figure 13:
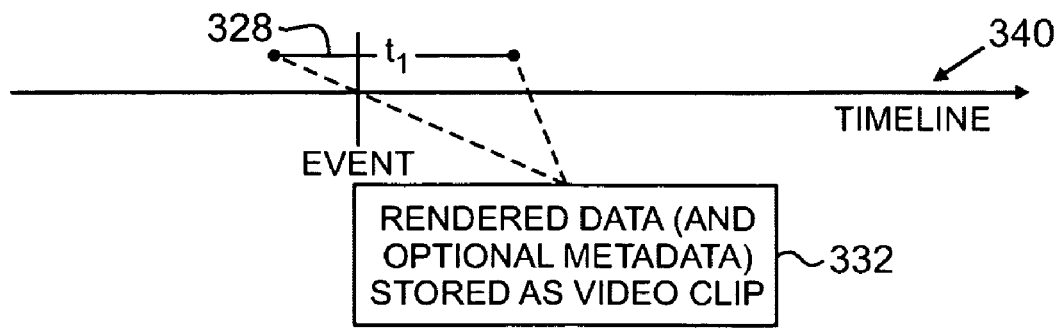
FIG. 13 illustrates storage of a video scene that has been cached.

FIG. 13 shows a situation where a scene 328 having a duration $t_i$ is stored following being cached. In FIG. 13, a predetermined criterion has occurred or a user input has indicated that a scene is to recorded. The scene is stored (step 332), in which case all or part of the contents of the cache are stored in a persistent memory as a video clip. In addition to the scene being stored as a video clip, optional metadata may be stored as may be retrieved from the game engine or otherwise generated.

Figure 14:
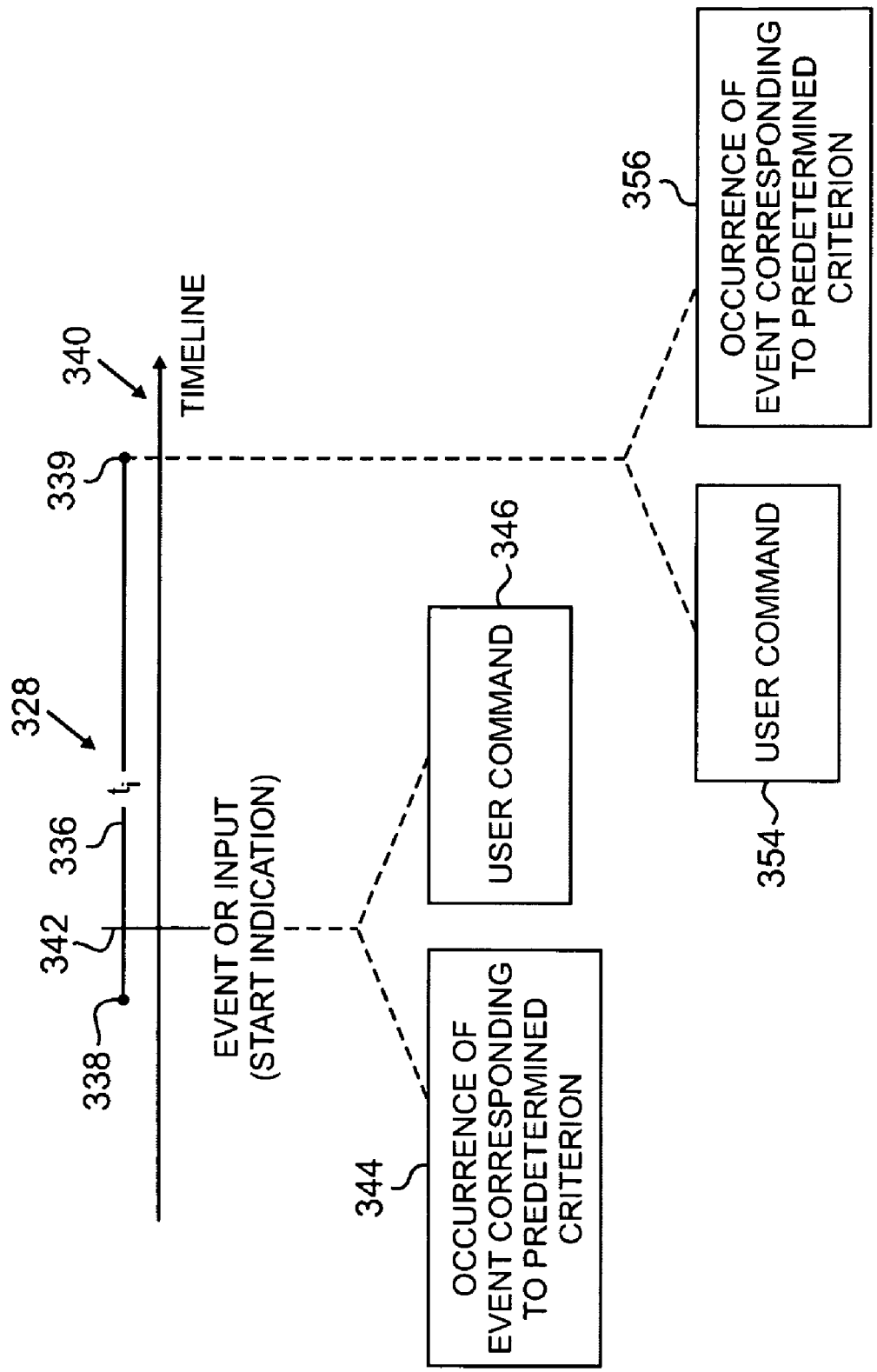
FIG. 14 illustrates exemplary ways in which a cached video scene may be caused to be stored as a video clip.

FIG. 14 illustrates branching points in the recording phase 300, in particular those occurring to cause the starting and ending of the video clip 328. The video clip 328 has a starting time 338 and an ending time 339. The video clip 328 also has a duration 336 equal to a time $t_i$. On the timeline 340, an event has occurred at a time 342 that matches a predetermined criterion. Alternatively, the system may have received a user input at time 342. As a consequence, the video clip 328, once stored, includes video that occurred prior to time 342 as well as video that occurred subsequent to time 342. The dotted-line tree on the left includes events that may initiate the storage of the video clip 328. The dotted-line tree on the right includes events that may cause the end or termination point of the video clip 328.

The video clip 328 may be caused to be stored upon either the occurrence of an event that matches a predetermined criterion (step 344), or upon a user command (step 346). In the first case, once an event that matches a predetermined criterion has been determined to have occurred, the cached video may be marked for storage as above. This technique is described in greater detail in connection with FIG. 6. The predetermined criteria may be any of the criteria mentioned above, especially those particularly useful for initiating a video chronicle of events occurring to or in the context of a video game character. As above, predetermined criteria may be determined to have occurred by suitable analysis of game parameters as provided by a game engine module, e.g., by comparison of such parameters to known or desired criteria.

In the case of a user command, the user selects a button or menu item, or presses a key on a keyboard, e.g., one set as a hotkey, or in any other way indicates that the user chooses to have a video clip made of the events currently occurring in the video game. In certain implementations, the user may indicate if the clip should be of the entire cached video, or a subset thereof. For example, the user may indicate that the clip is to start from the earliest recorded time in the cache or if the clip is to start at the moment of user input, or at points in time in between. Other such start times may be indicated. For example, systems may be implemented which have a default length of video (prior to a start indication) stored, e.g., five seconds, ten seconds, fifteen seconds, one minute, or even longer. Generally, when the user input is received, the contents of the video cache are not immediately stored, since the desired video scene is still occurring. Rather, the scene is marked for storage, and once the scene is over, the cached video is transferred or copied to a storage location, along with any suitable identifying data, e.g., metadata or the like. The transferring or copying may also occur at an intermediate point in time.

It will be apparent that other causal circumstances may also mark a video clip for future storage.

The ending time 339 of a video clip 328 may be caused by several circumstances as well, as has been described. The cause of the ending of a video clip 328 may be either user command (step 354) or the occurrence of an event that matches a predetermined criterion (step 356). For example, the ending time may be initiated by, e.g., the defeat of a particularly NPC, the end of a battle, the defeat of a subject player or of a group associated with the subject player, or the like. In many cases, the ending time may be a predetermined period of time, e.g., 5 or 10 seconds, following the occurrence of the predetermined criterion. Alternatively, a default video clip time may be imposed, e.g., where neither user input nor a predetermined criterion has previously ended the video clip.

In general, upon the occurrence of the ending time, a given video clip may be transferred to a persistent storage location. Alternatively, once a given video scene is marked for future storage, the cached portion of the video scene may be immediately stored and any later-recorded portions of the video scene may be either cached and immediately stored, cached for later storage, or immediately recorded into persistent storage.

Figure 15:
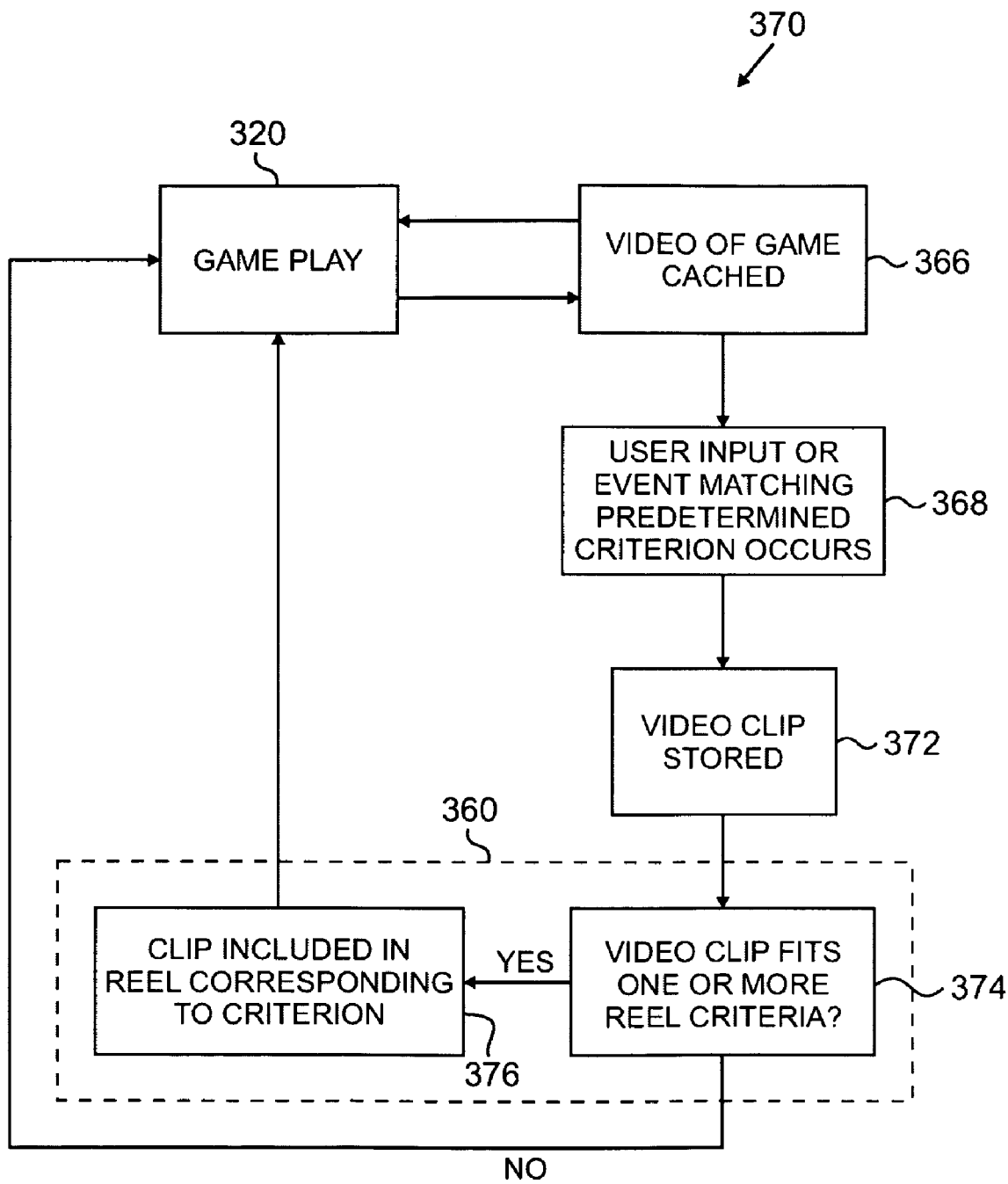
FIG. 15 is a flowchart of steps in a recording stage or phase.

A method 370 which may implement the recording phase is indicated in FIG. 15. Game play occurs (step 320), and a running recording of the game's rendered audio and video is cached (step 366). An event occurs which matches a predetermined criterion, or a user input is received (step 368), and this start indication results in the marking of a video clip (step 372) for storage. Data about the video clip is also generally received from the game engine, and a determination is made as to whether the video clip matches a reel criterion, i.e., whether the video clip matches a criterion that has been established on which video clips may be grouped into a video reel (step 374). For example, a reel criterion may be established such that all times when a particular PC are defeated are grouped together. If the video clip fits one or more reel criterion, then the video clip is associated with those reel(s) (step 376), i.e., the video clip is included in a video reel corresponding to that reel criterion, and the process starts over (step 320). If the video clip does not fit a reel criterion, then the clip is still maintained in storage but is not associated with a reel. The process then begins again (step 320).

In certain implementations, the determination of whether a video clip fits a reel criterion, and the subsequent association step, form a portion 360 of the editing process. They are shown in this method 370 since the steps may be performed contemporaneously. However, it should be clear that associating video clips into video reels may be performed as part of the recording process, as part of the editing process, or even after the clips have been uploaded.

Figure 16:
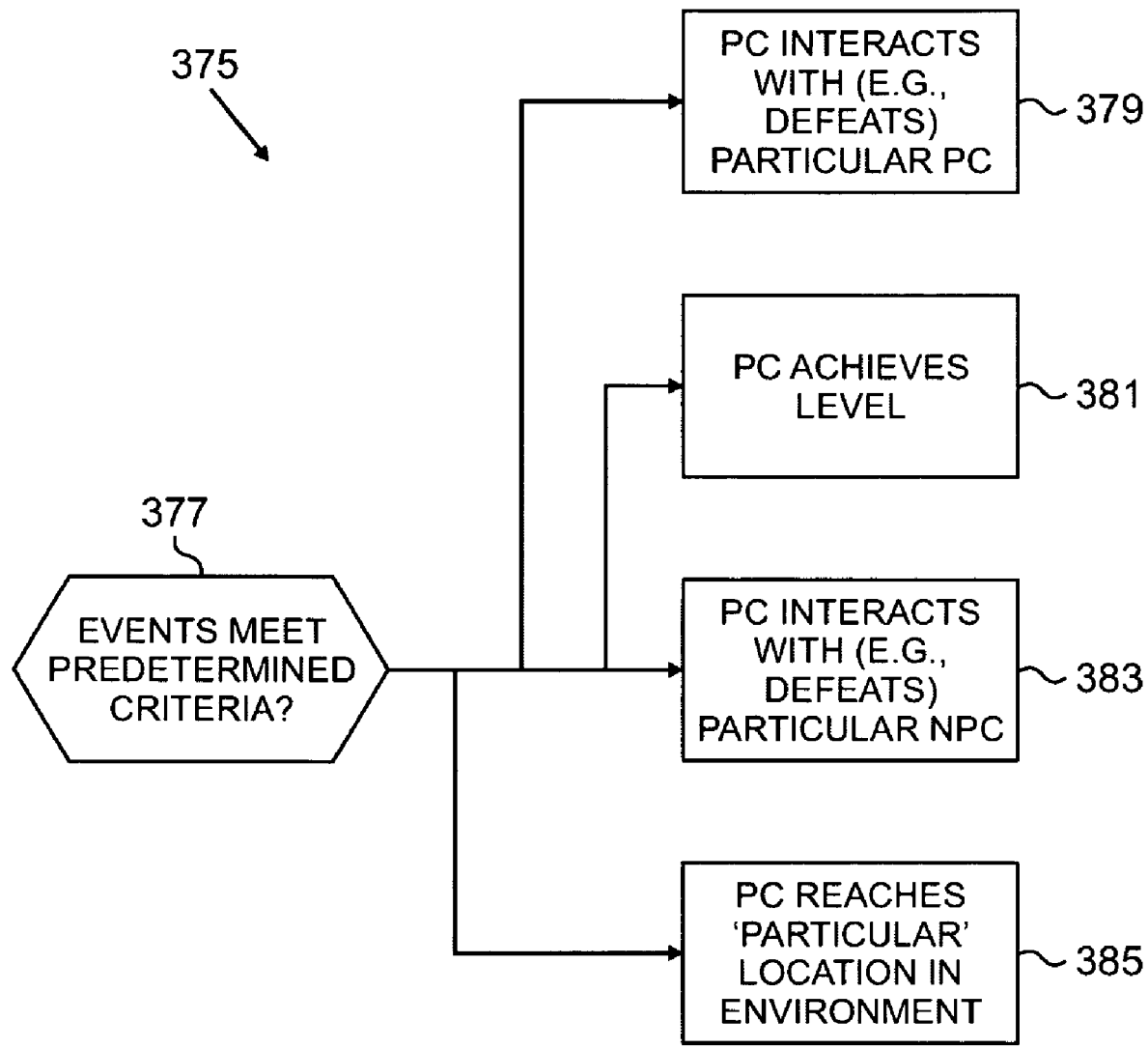
FIG. 16 is a flowchart illustrating exemplary ways in which an event may meet a predetermined criterion.

FIG. 16 is a flowchart 375 illustrating four exemplary ways in which an event occurring in a video game may meet or match a predetermined criterion. It will be clear that these four ways are in no way exhaustive, and that numerous predetermined criteria may be employed.

One type of event that may give rise to a video clip being stored is that a subject PC may interact with, e.g., defeat, a particular other PC (step 379). For example, a user or player may have a friend that they enjoy playing against. The player may deem it worth noting, in a video clip or video reel, each time they defeat their friend. Consequently, each defeat may be recorded as a video clip and the video clips may be combined into a video reel. Game parameters that may determine such an event are numerous, but may include a health variable of the friend's PC and whether the player's PC and the friend's PC are in combat at the time the friend's PC's health parameter drops below a predetermined threshold, which may be one indication of defeat at the hand of the subject PC.

More refined parameters may include whether the subject PC defeated the friend PC in a particular manner, whether the subject PC defeated the friend PC at a time when the subject PC was about to be defeated themselves, and the like.

Another type of event that may give rise to a video clip being stored is that a PC achieves a given level (step 381). In this connection, it is noted that PCs generally rise in level as experience points are gained, quests are completed, and so on. A video clip may be created upon each level completion or upon notable level achievements such as level 20, 40, 60, and so on, and some or all of these level achievements may be combined into a video reel. In another implementation, a video clip may be created when a PC changes their status in any other way, e.g., a change or increase in skill or talents.

A further type of event that may result or cause a video clip to be stored is when a PC interacts with a predetermined NPC (step 383). In particular, a given NPC may be deemed special or noteworthy, and PC interaction with the same may mark a certain achievement. Such an interaction may be deemed to have occurred when a PC targets the NPC, is located within a predetermined radius of the NPC (and which may vary based on level, level differences, or any other parameter), or via any other measure.

Another type of event that may result or cause a video clip to be stored is when a PC reaches or is otherwise geographically coincident with a given boundary or geographic location within the virtual game environment (step 385). For example, if a PC reaches a particular city, gate, landmark, dungeon, or other geographic location, that event may be selected for video clip storage.

Those of ordinary skill in the art will recognize that, given this disclosure and teaching, numerous other types of events, as dictated by the player or by the developer, may also give rise to a video clip being stored. For example, finding a predetermined item or environment detail may be cause for a video clip being stored. Defeating a given NPC or PC when the subject PC's health is at a very low level (e.g., 5% or less) may give rise to a video clip being stored. In some cases, humorous events may be subjects of video clips. For example, a defeat by a particularly notorious NPC may be made into a video clip, and in this or other circumstances, automatic notification of a user's friends may be especially appropriate. Another trigger for video clip storage may be by the system monitoring chat channels, such as guild or raid channels, and storing a video clip upon determination that a keyword has been used, e.g. the name of a specific NPC. In an audio chat channel, the system may employ voice recognition to determine if such a keyword has been spoken.

Figure 17:
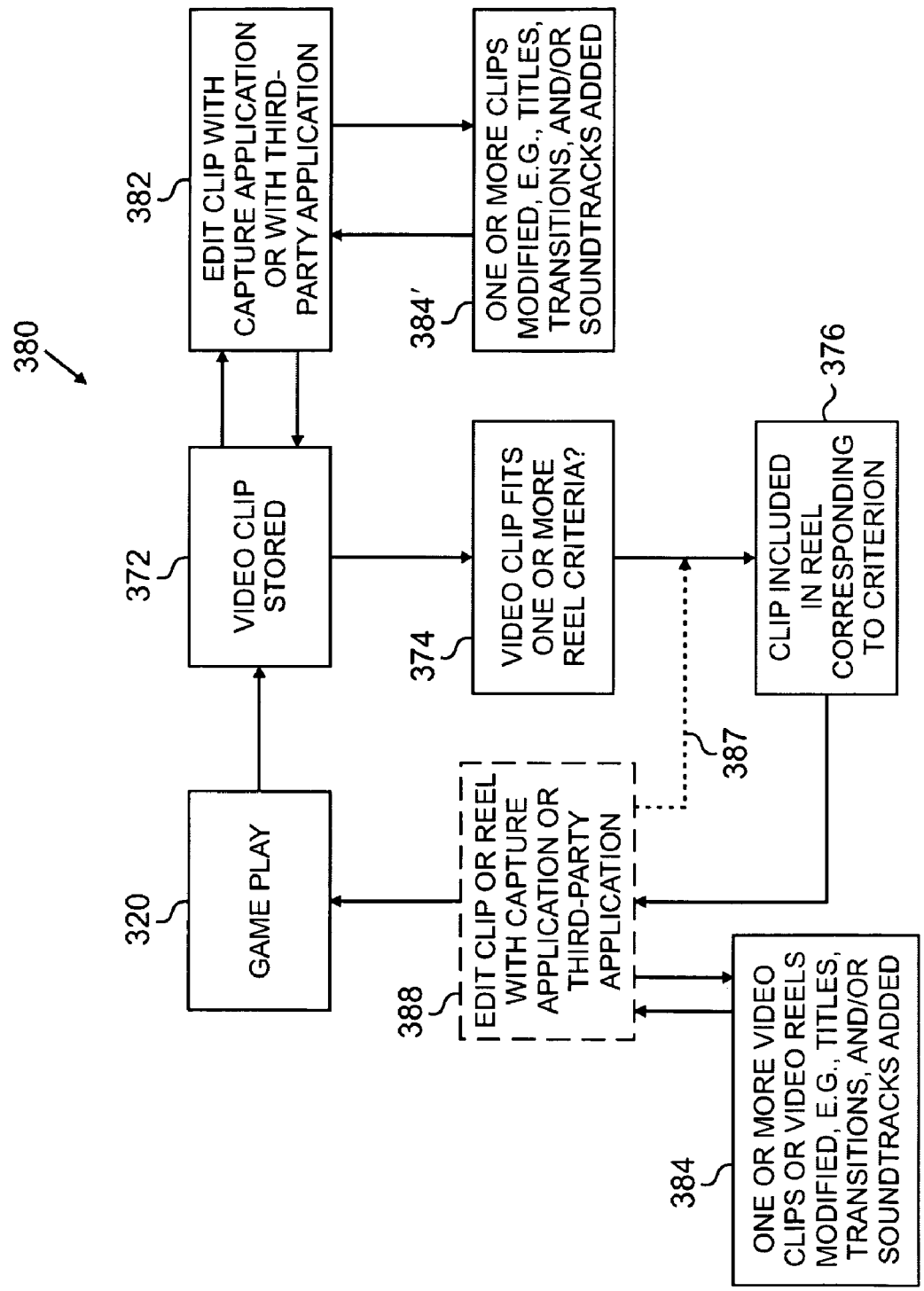
FIG. 17 is a flowchart of steps in an editing stage or phase.

Referring to FIG. 17, a flowchart is shown of a method 380 for editing video clips and video reels. As noted above, an editing step may occur during or after game play, and may further occur before or after the optional step of combining video clips into a video reel. As a portion of the editing phase 350 may overlap with a portion of the recording phase 300, a portion of the method 380 may overlap with a portion of the method 370 (FIG. 15).

In one implementation, during game play (step 320), a video clip is stored (step 372) employing the methods in the recording phase 300. If a video clip is determined (step 374) to fit one or more reel criteria, then the clip is included (step 376) in the video reel corresponding to the reel criterion. A video reel may include clips based on just one PC's exploits or may include video clips as viewed by several players, e.g., those within a guild or other group, performing a raid, quest, instance, or other mutual exploit.

The video clip, or the video reel, may then be edited with one or more applications (step 388). The editing step may include any of the edits mentioned above, including having one or more clips modified (step 384), such as by having titles, transitions, or soundtracks added. Numerous other edits and modifications may also be applied. Even if the video clip is not included in a video reel, the stored video clip may be edited in any way, including with any of the applications mentioned above (step 382). Similar modifications (step 384') may be applied to these individual video clips.

In some implementations, the editing application may be the application used to record the video clips and/or the application used to combine the video clips into video reels. The editing application may also be an application associated with the video game, such as one available as part of the game environment or accessible through the game lobby, or may be a separate third-party application, such as Windows Movie Make™.

While edits have been described such as adding titles, transitions, or soundtracks, it will be noted that the level of editing is limited only by the capabilities of the user's editing software applications. In some cases, editing applications may be provided, such as in-game editing applications, that allow scenes to be re-composed to better feature all of the PCs and NPCs involved. Stock footage may be added, e.g., giving the history of a particular enemy prior to the same's defeat at the hand of the player's PC or group. The player may record audio and/or video commentary using a webcam or microphone, and may add the same to the video clip or video reel. Using character data stored in a game database, a video clip including a panoramic shot of all PCs involved in a quest or raid may be generated, even though such a group depiction may never have occurred during actual gameplay. Numerous variations will be apparent.

Figure 18:
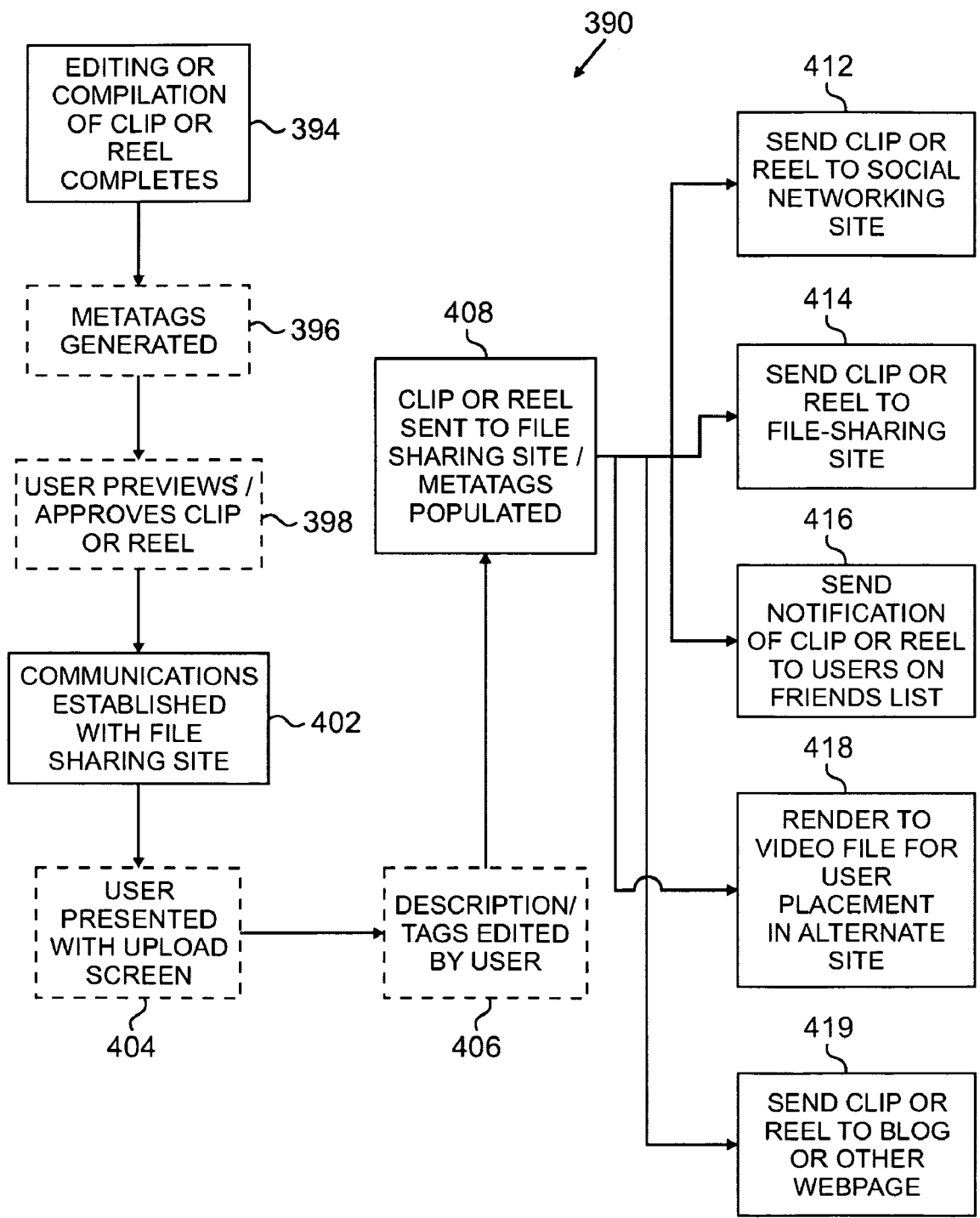
FIG. 18 is a flowchart of steps in an uploading or sharing stage or phase.

FIG. 18 is a flowchart of a method 390 for uploading or sharing the stored and optionally-edited video clips and video reels. For example, the file-sharing and social networking sites may either store for viewing the entire video clip or video reel or may provide a link to another site on which the video clip or video reel is stored. In other implementations, a short preview version of the video clip or video reel may be stored on the site, so that viewers may sample the video clip or video reel prior to viewing or downloading the entire version. The file-sharing site may be a user's personal webpage, a webpage within the environment of the game, a webpage associated with the game, a webpage associated with a group within the game such as a guild, or any other type of file-sharing site. Notification of the video clip or reel, or the video clip or reel itself, may be emailed to other users, or to a group using a friends list, guild list, or the like.

A first step is that any editing or compilation of the video clips and video reels completes (step 394) and the edits are saved. A next step, which is optional, is the generation of metadata or other data corresponding to the video clips or video reel, as well as the retrieval of any metadata previously stored in the storage step, if any. Metadata comprise data that may be used to identify the generator of the video, identify the subject matter, and which may tell viewers information about the video. These may be used within the target uploading site to help users search for the posted video. For example, the metadata may include the name of the PCs seen in the video, the name of any pertinent NPCs, the game played in the video, the guild portrayed in the video, the server the game was played on (if different servers are available), the zone of the multiplayer environment (if applicable), the 'kill times' of the enemies, e.g., bosses, defeated, as well as optional user-generated commentary. Such data fields may in some cases be filled-in by a metadata generator using data from the game engine, and for this reason a certain amount of metadata generation may occur during the storage step. Such metadata, as well as others, may be employed in step 396 to populate metadata fields in a target file-sharing site, social networking site, or other web site or blog.

A next step, which is also optional, is that a user is given the opportunity to preview the video clip or video reel (step 398). If the user is not satisfied, the user may return to the editing phase or may choose to return to game play to allow more video clips to be captured.

A next step is that the user's computing device establishes communications with the file-sharing site (step 402), which as noted may be a social networking site, a site associated with and sharing a common interface with the video game, a blog, or any other such site. If the file-sharing site has a log-on procedure, the user may do so manually or the user's system may automatically log-on using pre-stored credentials. In some cases, where games are accessed via a game lobby system, such as the Station® system, the lobby system access credentials may be employed to gain access to an affiliated file-sharing site.

A next step is that the user is presented with an upload or share screen whereby video clips or video reels may be uploaded or shared (step 404). This step is optional, as users may select their upload settings such that any video clips or video reels are automatically uploaded or shared upon log-in. Even in such cases, the user may be presented with a dialog box requesting confirmation of the upload. Alternatively, a button or other selectable element on an editing panel or other window associated with the video clip or reel may allow automatic uploading or sharing to one or more sites (see FIGS. 20-23).

The user may optionally edit certain descriptive elements, including descriptive text and metadata (step 406). In particular, the user may edit certain metadata to their satisfaction, though other metadata may be made uneditable, e.g., game played, server, or the like. In some cases, metadata may include automatically-generated descriptive text, e.g., a history of a defeated NPC, and this text may generally be edited or appended to by the user. Various other fields may be edited by the user, according to how the user wishes the video clip or video reel to be described.

The video clip or video reel is then uploaded to the file-sharing site, and the site metadata fields are populated by the generated metadata (step 408). In some implementations, only a link to the original file is sent.

The uploading or sharing (step 408) may be carried out in a number of ways. One type of uploading includes sending the video clip or video reel to a social networking site (step 412), e.g., Facebook®. This step may occur automatically, the user may be prompted for such a sending, or the user may manually upload the video clip or reel to the site. Another type of uploading may include sending a video clip or video reel to a file-sharing site (step 414). A notification of the uploaded, posted, or shared video clip or video reel may be sent to friends of the player (step 416) if a friends or other such list has been created. Such a notification may also be manually sent, and in any case may be sent via email, instant message, or the like. Alternatively, the video clip or video reel itself may be sent.

In any notification, a multiplayer game may have a system for maintaining information about the PCs in the game. Users may provide information to the system about whom they would like to be notified of uploaded video. The user may provide several lists, e.g., a friends list, a guild list, a raid party list, and other such groupings. When a video clip or video reel is posted, each user on the one or more lists (as dictated by the settings controlled by the player) may receive an email, an SMS, in-game mail, or other such notification of the posting, or a copy of the posted file itself.

The transmission or sending of a video clip or video reel in an automatic fashion to a file-sharing site may occur on any number of schedules. For example, the sending may occur as soon as the video is generated. Alternatively, the video may be sent at the end of a play session. In other implementations, videos may be sent on a regular basis once a day, once a week, etc. Videos sent manually may be uploaded on any schedule the player desires.

The system and method may also generate and provide rendered video, e.g., a Windows Media Video™ file, MPEG-4, or Quicktime® video file, for a user to manually upload to their own web page or to a file-sharing site (step 418). The file may be provided in any format for such purposes. Besides the above-noted types of sites, video clips or video reels may also be uploaded to any sort of blog or other webpage (step 419).

Figure 19:
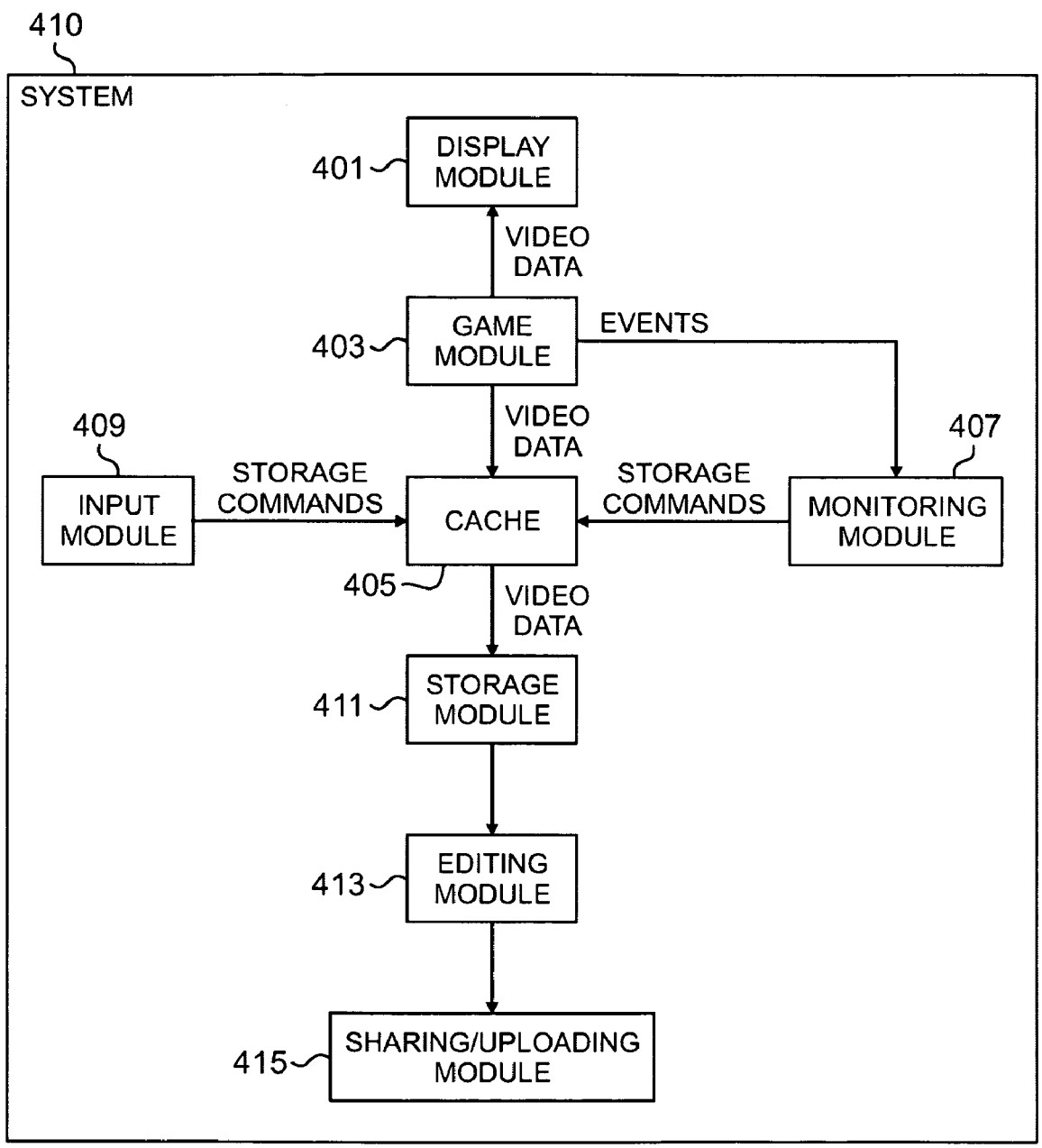
FIG. 19 illustrates a modular system for automatically sharing video highlights, the system showing components and data flow.

FIG. 19 shows an arrangement 410 which may implement the system for automatically generating a video clip or video reel for uploading or sharing. A game module 403 generally operates the multiuser environment or multiplayer game, and generally includes (not shown) a user interface module, a database module, and a game engine module. The game module 403 provides display information to a display module 401, and the display module 401 renders audio and video data which is then enjoyed by a player. Rendered audio and video data is also cached in a cache 405. In some implementations, the cache 405 may be formed as a part of the game module 403 or the display module 401.

A monitoring module 407 may serve to monitor the events that occur, e.g., as part of the operation of the game module 403. The monitoring module 407 may perform this task in a number of ways. For example, the monitoring module 407 may review occurring events against a list of predetermined criteria. When a event is found that matches or exceeds a predetermined criteria (depending on the nature of the event), then that event may cause storage of a video clip corresponding to the event. Alternatively, an input module 409 may receive commands from a player about when to store a cached video scene as a video clip. As noted above, the input module 409 may also receive an indication from a player about when to stop the recording of a video clip.

A storage module 411 provides storage for the video clips formed from the cached video, and may further provide storage for video reels created from the video clips. An editing module 413 provides the editing functionality for the video clips and video reels. As noted above, the editing module 413 may be one application or a combination of a number of applications, including separate third-party applications, applications associated with or formed as a module within a video game, including those sharing a common interface, or the like.

The sharing or uploading module 415 transmits the entries to a web page, blog, file-sharing site, social networking site, or alternatively provides ready-made video files, e.g., a Quicktime® video file, so that the user can upload the same into any type of web page desired. In one implementation, the sharing or uploading module 415 provides a series of radio buttons (or other indicators) allowing the user to choose whether they wish to post the entry to a file-sharing site such as Crackle™, create a video file for later posting, or post the entry on a PC's blog site. In another implementation, a settings panel or menu may allow the user to indicate that any or all future video files be posted to the desired site, rather than having the user choose for each individual file.

The modules may be combined in any number of combinations as will be clear to one of ordinary skill in the art given this teaching and disclosure. The data collected using the above-described system may be stored on the client side, on the server side, or via a combination of client-side and server-side storage.

Figure 20:
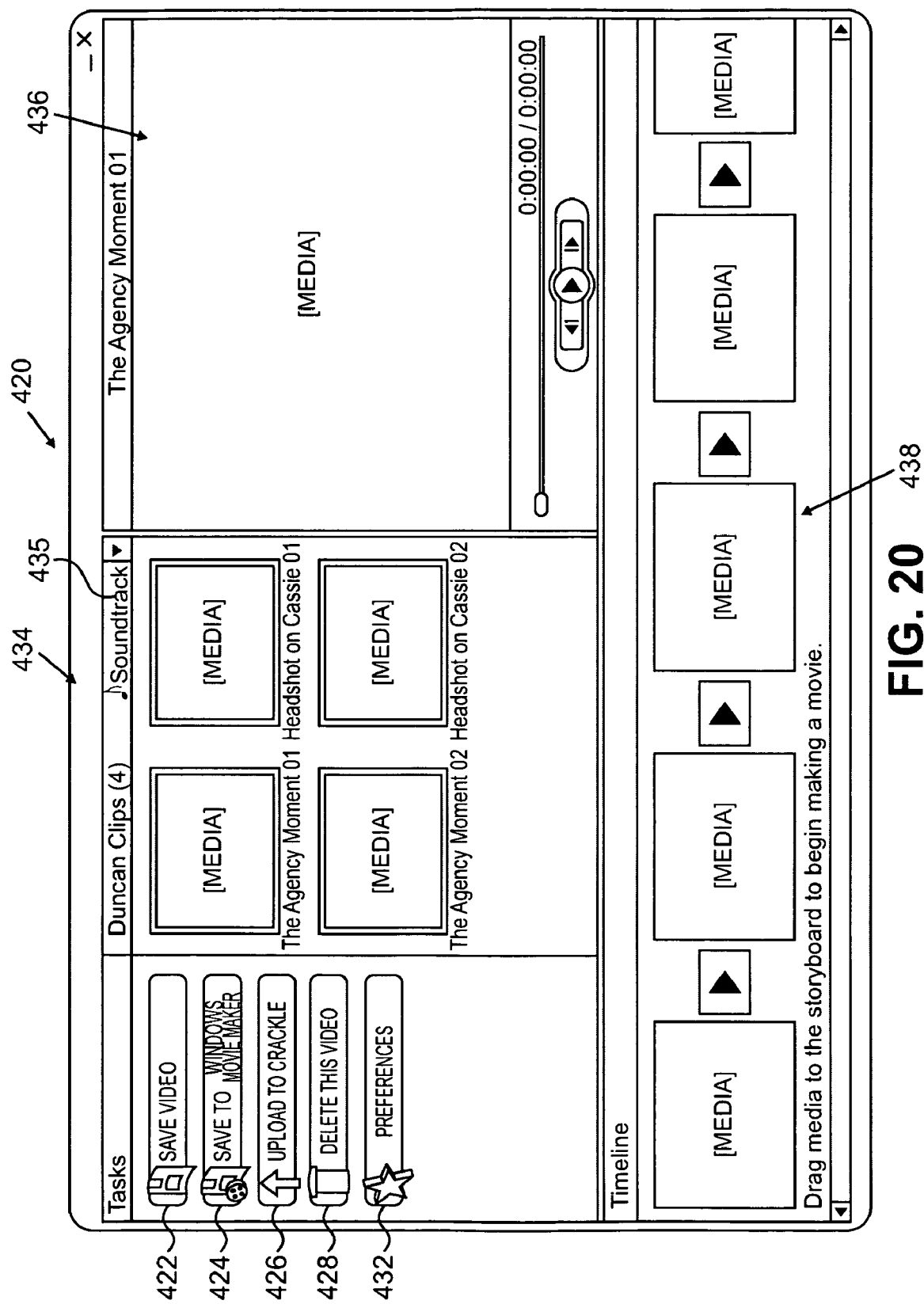
FIG. 20 illustrates a mockup of a display screen that may appear following a gaming session in which video was recorded.

FIG. 20 illustrates an exemplary mock-up of a user interface 420 that may be employed to edit and upload video clips and video reels. The user interface 420 includes a window 434 to display a library of video clips, a video playback screen 436, a series of function buttons 422-432, and a storyboard timeline 438 on which clips may be dragged to create a movie or video reel. A soundtrack menu 435 allows soundtrack features to be added to one or more video clips or reels.

The window 434 displays a library or compilation of the stored video clips. Any of these may be viewed in the video playback screen 436. The video clips are dragged from the window 434 to the storyboard timeline 438 in any order to manually create a movie or video reel that features all of the desired video clips in any given order. Once on the storyboard, video clips may be dragged from one location to another so as to change the playback order.

As noted, much of the functionality of the user interface 420 may be automated. For example, a reel criterion may cause a series of related video clips to be formed into a video reel automatically, where the playback order is determined by a default setting, e.g., the order in which they occurred. However, the user interface 420 allows a degree of customization and user input. In some cases, a reel criterion may be employed to determine which video clips are placed in window 434. One such reel criterion may cause all video clips associated with a group, e.g., a guild, to be placed into the window 434; in one implementation of this reel criterion, server-side video clip or reel storage may be employed, so that the system has access to all guild member clips. In other exemplary cases, all video clips, or all video clips not already organized into a video reel, may be presented in the window 434.

Buttons are shown on the left-hand side to provide various functionality. Button 422 saves the current video reel. Button 424 saves the current video reel in a format suitable for editing in Windows Movie Maker®. Button 426 uploads the current video reel to Crackle™. Button 428 deletes the current video reel. Button 432 allows the user to set various preferences. Analogous buttons or other selectable elements for other functions may also be provided.

Figure 21:
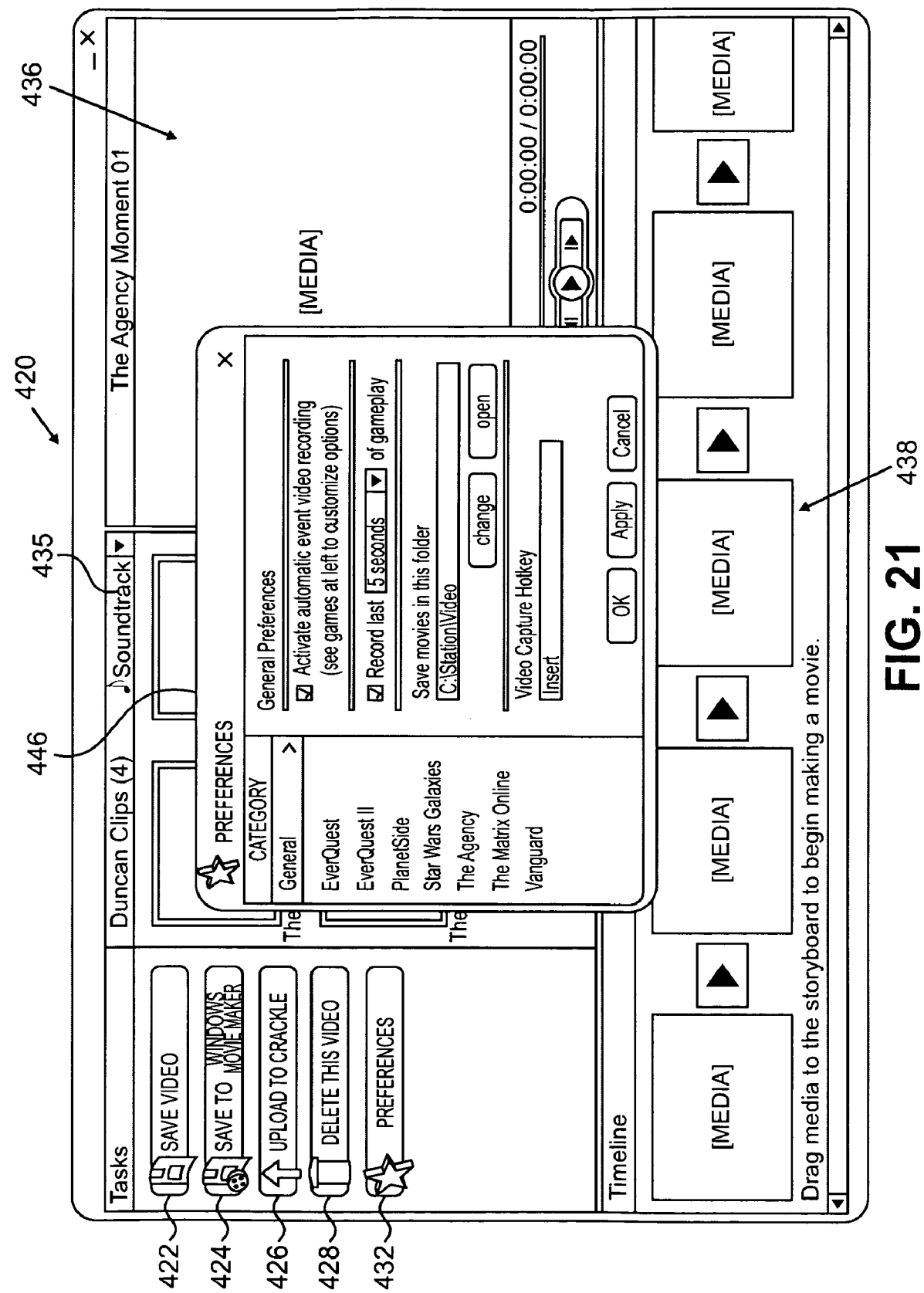

FIG. 21 shows one implementation of a preferences selection window 446 (e.g., accessible by selecting button 428). The window 446 sets general preferences, rather than game-specific preferences. Exemplary preferences shown include an activation check box, to allow the system to be inactivated if desired. Other preferences include the amount of video (measured in time) to store in the cache, a storage location for video clips, and a hotkey to allow user initiation of video clip recording and storage.

Figure 22:
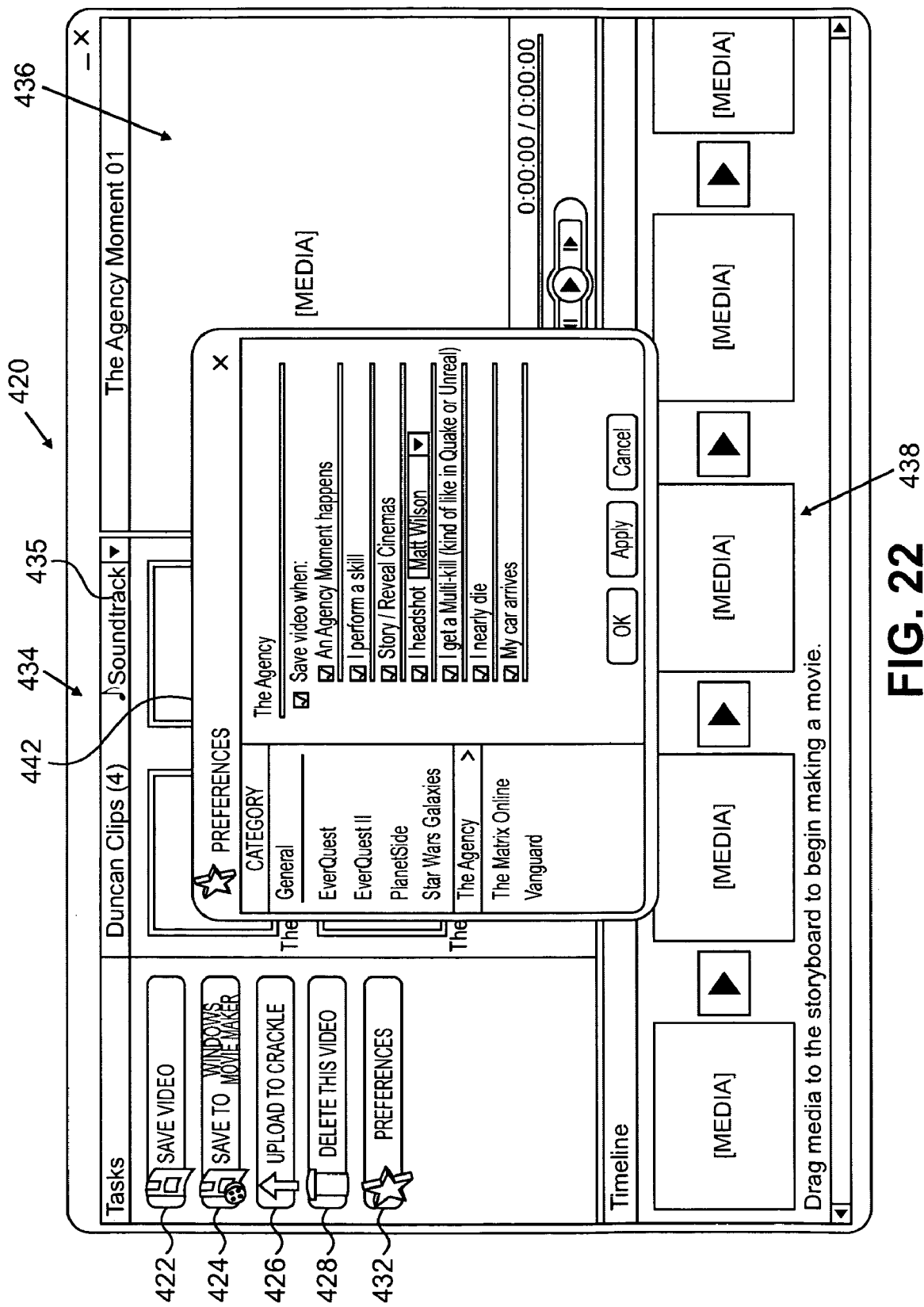
FIG. 22 illustrates various automatic recording options for a first game type.
Figure 23:
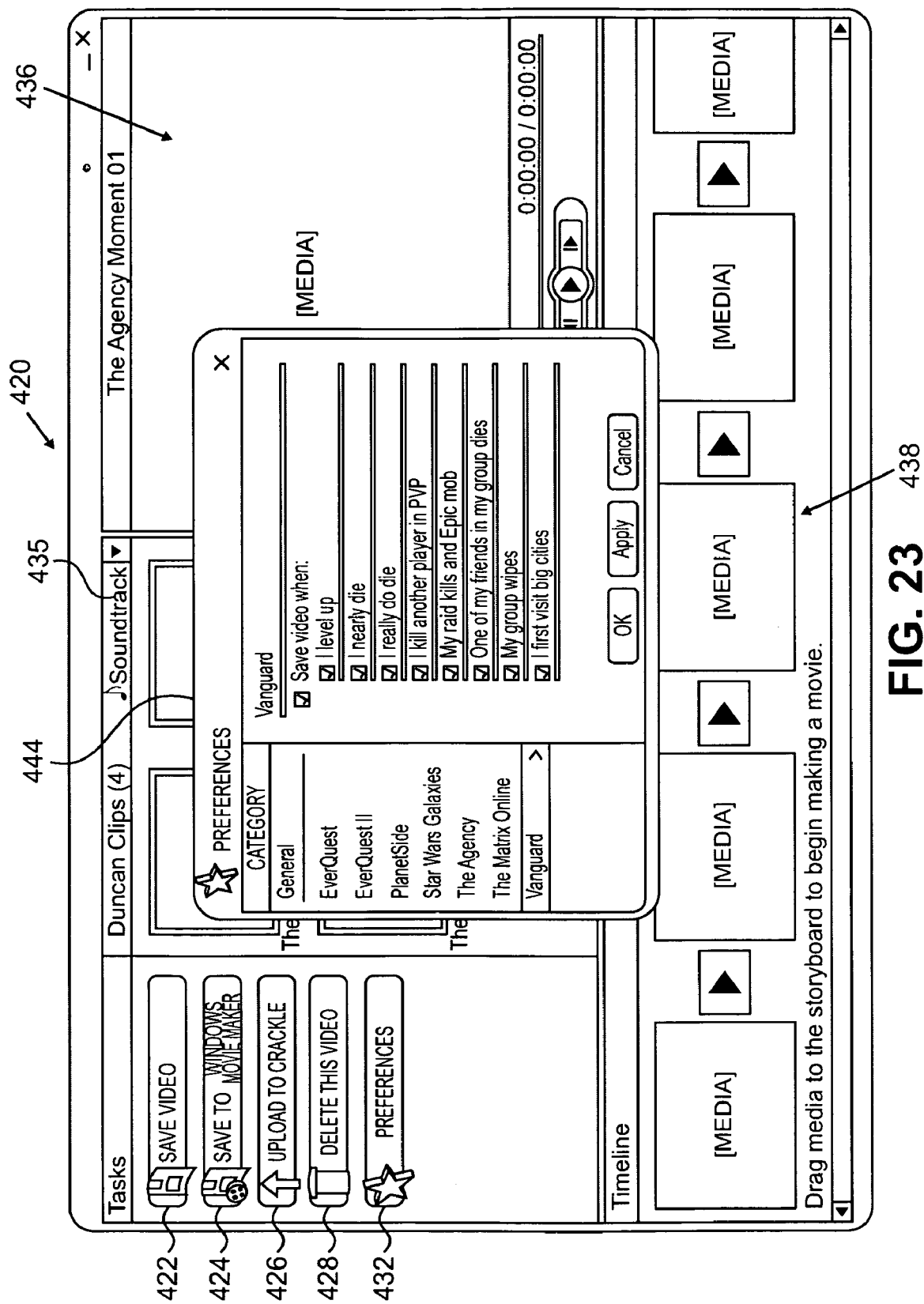
FIG. 23 illustrates various automatic recording options for a second game type.

FIG. 22 shows an implementation of a preferences selection window 442, this preferences selection window specific to a particular game, e.g., The Agency™. In particular, this window 442 may be an overlay on window 446, but in the case of window 442, the user has selected a particular game rather than general preferences. Window 442 lists a number of different events for which a user may cause video to be recorded. By deselecting the check boxes, users can choose to not have certain videos captured. Window 442 includes events such as "An Agency Moment happens" (which are predefined notable events particular to The Agency™ game), when a subject PC performs a skill, when a cinematic sequence is revealed, when a subject PC kills another PC via a "headshot", when multiple PCs are killed by a subject PC, when a subject PC is close to death, or when the subject PC's car arrives. In the exemplary case of the headshot of a particular opponent, a drop-down menu may be provided to allowed which opponent is the subject of a video clip. In some implementations, all opponents may be selected. It will be clear that each different game may have a different set of notable events, though there may be overlap between games. For example, FIG. 23 illustrates a preferences window 444 for another game, Vanguard®. In this game, certain events that cause video clip storage are the same as for The Agency™, although several others differ.

One implementation of the gaming video highlights system includes one or more programmable processors and corresponding computer system components to store and execute computer instructions, such as to provide the recording and storage of video, the recognition of interesting or important events, the editing of video, and the uploading of video data to a server. In another implementation, video of significant events could be captured server-side, not affecting a player's computer performance, and so the server includes, e.g., appropriate recording, storage, and recognition software and hardware components.

Additional variations and implementations are also possible. For example, an implementation could store highlights from a speech or lecture, triggered by keywords in the audio or video. In another example, the highlights or samples could be collected from multiple live or recorded online sources, similar to a news clipping service. While the above description has focused on implementations where video reels are created based on comparisons to reel criteria, video clips may be added to video reels based on user input, and in this way entirely customized video reels may be created. Video clips may be combined into video reels following the uploading step.

In a further implementation, the systems and methods described here may be used in non-MMORPG game contexts. For example, the game system need not be continuously online, and the game need not be a multiplayer one. The user's game system may be employed to track events and generate video clips and video reels, and once a connection is made to the internet (or any other such network), the clips or reels may be transmitted and consumed in any way noted above.

Accordingly, various applications including but not limited to games are within the scope of the invention.

The invention claimed is:

1. A system for automatically recording and storing a video clip of events occurring in a video game, comprising:
   a. a cache for caching a video scene of events in a video game;
   b. an input module configured to receive a start indication from a user that a video clip is to be stored, wherein upon receipt of the start indication, at least a portion of the video scene stored in the cache is marked for transfer to a storage module as a video clip; and
   c. a storage module in which to store the video clip;
   d. such that the stored video clip includes:
      i. at least a portion of video data cached prior to the start indication; and
      ii. at least a portion of video data cached or stored subsequent to the start indication.

2. The system of claim 1, further comprising a monitoring module for monitoring events occurring in a video game, wherein if an event occurs that matches a predetermined criterion, the storage module is directed to store a video clip of the event from the cache, such that the stored video clip includes at least a portion of video data cached prior to the event and at least a portion of video data cached subsequent to the event.

3. The system of claim 2, wherein the predetermined criteria includes one or more of the following:
   a. whether a subject player character has reached a predetermined geographic boundary within the multiplayer game;
   b. whether a subject player character has interacted with a predetermined non-player character or item;
   c. whether a subject player character has interacted with a predetermined player character or item;
   d. whether a subject player character has defeated a predetermined player character or non-player character;
   e. whether a subject player character has achieved a predetermined level, or changed levels, within the multiplayer game; and
   f. whether a subject player character has accumulated at least a predetermined number of points or items within the multiplayer game.

4. The system of claim 1, further comprising an upload module, the upload module to upload one or more stored video clips to a blog, a web page, a social networking site, or a file-sharing site.

5. The system of claim 4, further comprising an editing module, to enable editing of the one or more stored video clips prior to upload.

6. The system of claim 5, wherein the editing module combines two or more video clips into a video reel.

7. The system of claim 4, wherein the upload module uploads metadata associated with the video clip to the blog, web page, social networking site, or file-sharing site.

8. The system of claim 7, wherein the upload module is configured to accept metadata edits by a user.

9. A system for automatically recording and storing a video clip of events occurring in a video game, comprising:
   a. a cache for caching a video scene of events in a video game;
   b. a monitoring module for monitoring events occurring in the video game, wherein if an event occurs that matches a predetermined criterion, a storage module is directed to store a video clip of the event from the cache, such that the stored video clip includes at least a portion of video data cached prior to the event and at least a portion of video data cached subsequent to the event; and
   c. a storage module in which to store the video clip.

10. The system of claim 9, further comprising an input module configured to receive a start indication from a user that a video clip is to be stored, wherein upon receipt of the start indication, at least a portion of the video scene stored in the cache is marked for transfer to a storage module as a video clip.

11. The system of claim 9, further comprising an upload module, the upload module to upload one or more stored video clips to a blog, a web page, a social networking site, or a file-sharing site.

12. The system of claim 9, wherein the predetermined criteria includes one or more of the following:
   a. whether a subject player character has reached a predetermined geographic boundary within the multiplayer game;
   b. whether a subject player character has interacted with a predetermined non-player character or item;
   c. whether a subject player character has interacted with a predetermined player character or item;
   d. whether a subject player character has defeated a predetermined player character or non-player character;
   e. whether a subject player character has achieved a predetermined level, or changed levels, within the multiplayer game; and
   f. whether a subject player character has accumulated at least a predetermined number of points or items within the multiplayer game.

13. The system of claim 9, further comprising an editing module, to enable editing of the one or more stored video clips prior to upload.

14. A method of automatically recording and storing a video clip of events occurring in a video game, comprising:
   a. caching video image data rendered by a video game;
   b. if a user indicates that the video image data is to be stored, then storing a video clip corresponding to the video image data, the video clip beginning at a time prior to the user indication and ending at a time subsequent to the user indication; or
   c. if an event occurs that matches a predetermined criterion, then storing a video clip corresponding to the video image data, the video clip beginning at a time prior to the event and ending at a time subsequent to the event.

15. The method of claim 14, further comprising transmitting a notification of the video clip, or the video clip itself, to one or more users.

16. The method of claim 14, further comprising uploading the stored video clip to a blog, a web page, a social networking site, or a file-sharing site.

17. The method of claim 16, further comprising uploading metadata associated with the video clip to the blog, web page, social networking site, or file-sharing site.

18. The method of claim 17, wherein the uploading includes accepting metadata edits from a user.

19. The method of claim 14, wherein the predetermined criteria includes one or more of the following:
   a. whether the subject player character has reached a predetermined geographic boundary within the multiplayer game;
   b. whether the subject player character has interacted with a predetermined non-player character or item;
   c. whether the subject player character has interacted with a predetermined player character or item;
   d. whether the subject player character has defeated a predetermined player character or non-player character;
   e. whether the subject player character has achieved a predetermined level, or changed levels, within the multiplayer game; and
   f. whether the subject player character has accumulated at least a predetermined number of points or items within the multiplayer game.

20. The method of claim 14, further comprising editing the stored video clip.

21. The method of claim 20, wherein at least two video clips are stored, and wherein the editing combines the at least two video clips into a video reel.

22. A non-transitory computer-readable medium, containing instructions for causing a computer to implement the method of claim 14.

23. A non-transitory computer-readable medium, containing instructions for causing a computing device to implement a method of automatically recording and storing a video clip of events occurring in a video game, the instructions causing the computing device to:
   a. continuously capture video image data during gameplay of a video game;
   b. during the capture:
      i. mark a video clip for storage based on a received input from a user; or ii. mark a video clip for storage based on the occurrence of an event that matches a predetermined criterion;
c. following the marking step, store the video clip;
d. wherein the stored video clip includes at least a portion of a video scene that was rendered prior to the marking step.

24. The non-transitory computer-readable medium of claim 23, wherein the instructions further cause the computing device to upload the stored video clip to a blog, a web page, a social networking site, or a file-sharing site.

25. The non-transitory computer-readable medium of claim 23, wherein at least two video clips are stored, and wherein the instructions further cause the computing device to combine the at least two video clips into a video reel.

* * * * *